(12) United States Patent
Mukumoto et al.

(10) Patent No.: US 11,761,608 B2
(45) Date of Patent: Sep. 19, 2023

(54) PLANAR ILLUMINATION DEVICE

(71) Applicant: MINEBEA MITSUMI Inc., Nagano (JP)

(72) Inventors: Suguru Mukumoto, Kitasaku-gun (JP); Shogo Suzuki, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/000,857

(22) PCT Filed: Feb. 8, 2021

(86) PCT No.: PCT/JP2021/004566
§ 371 (c)(1),
(2) Date: Dec. 6, 2022

(87) PCT Pub. No.: WO2022/004036
PCT Pub. Date: Jan. 6, 2022

(65) Prior Publication Data
US 2023/0213167 A1 Jul. 6, 2023

(30) Foreign Application Priority Data
Jul. 1, 2020 (JP) .................................. 2020-114367

(51) Int. Cl.
*F21V 5/00* (2018.01)
*F21V 5/04* (2006.01)
(Continued)

(52) U.S. Cl.
CPC .............. *F21V 5/007* (2013.01); *F21V 5/045* (2013.01); *F21Y 2105/10* (2016.08); *G02B 3/08* (2013.01);
(Continued)

(58) Field of Classification Search
CPC . F21V 5/007; F21V 5/045; G02B 2027/0118; G02B 27/01; G02B 27/0101; G02B 3/08; G02B 6/0038; G02B 6/0053
See application file for complete search history.

(56) References Cited

U.S. PATENT DOCUMENTS

2007/0064174 A1   3/2007 Kitamura et al.
2014/0022645 A1   1/2014 Matsuura et al.
(Continued)

FOREIGN PATENT DOCUMENTS

JP   2007-087792 A   4/2007
JP   2009-169399 A   7/2009
(Continued)

OTHER PUBLICATIONS

Koyama et al., Luminaire and headup display device, 2018, JP2018018706A, https://worldwide.espacenet.com/patent/search/family/061081939/publication/JP2018018706A?q=pn%3DJP2018018706A (Year: 2018).*

(Continued)

*Primary Examiner* — Tracie Y Green
*Assistant Examiner* — Michael Chiang
(74) *Attorney, Agent, or Firm* — Pearne & Gordon LLP

(57) ABSTRACT

A planar illumination device of an embodiment includes a substrate, a first linear Fresnel lens, and a second linear Fresnel lens. The substrate includes a plurality of light sources disposed two-dimensionally in a grid pattern. The first linear Fresnel lens is disposed at an emission side of the plurality of light sources and formed with a groove constituting a concave-convex surface of the lens and extending in one direction. The second linear Fresnel lens is disposed at an emission side of the first linear Fresnel lens and formed (Continued)

with a groove constituting the concave-convex surface of the lens and extending in a direction orthogonal to the one direction.

14 Claims, 31 Drawing Sheets

(51) Int. Cl.
    *F21Y 105/10*     (2016.01)
    *G02B 27/01*     (2006.01)
    *G02B 3/08*     (2006.01)

(52) U.S. Cl.
    CPC ...... *G02B 27/01* (2013.01); *G02B 2027/0118* (2013.01)

(56) References Cited

U.S. PATENT DOCUMENTS

| | | | |
|---|---|---|---|
| 2017/0059859 A1* | 3/2017 | Haberl | G02B 27/0101 |
| 2019/0011611 A1* | 1/2019 | Kasazumi | G02B 3/08 |
| 2019/0162960 A1 | 5/2019 | Harada et al. | |
| 2020/0004067 A1* | 1/2020 | Hada | G02F 1/1347 |

FOREIGN PATENT DOCUMENTS

| | | | |
|---|---|---|---|
| JP | 2012-203176 A | | 10/2012 |
| JP | 2015-166684 A | | 9/2015 |
| JP | 2016-218391 A | | 12/2016 |
| JP | 2018-018706 A | | 2/2018 |
| JP | 2018018706 A | * | 2/2018 |
| JP | 2019-020704 A | | 2/2019 |
| JP | 2019020704 A | * | 2/2019 |
| JP | 2019-101056 A | | 6/2019 |

OTHER PUBLICATIONS

Shinzou, Liquid crystal luminaire, head-up display, and illumination method, 2019, JP2019020704A, https://worldwide.espacenet.com/patent/search/family/065355508/publication/JP2019020704A?q=pn%3DJP2019020704A (Year: 2018).*
International Preliminary Report on Patentability for corresponding International Application No. PCT/JP2021/004566 dated Aug. 10, 2021.
International Search Report for corresponding International Application No. PCT/JP2021/004566 dated Apr. 13, 2021.
Written Opinion for corresponding International Application No. PCT/JP2021/004566 dated Apr. 13, 2021.
Notice of Reasons for Refusal for corresponding Japanese Application No. 2021-563602 dated Nov. 16, 2021 and English translation.
Decision to Grant a Patent for corresponding Japanese Application No. 2021-563602 dated Jan. 11, 2022 and English translation.
Request for the Submission of an Opinion for corresponding Korean Application No. 2022-7003931 dated May 30, 2022 and English translation.
Written Decision on Registration for corresponding Korean Application No. 2022-7003931 dated Sep. 27, 2022 and English translation.

* cited by examiner

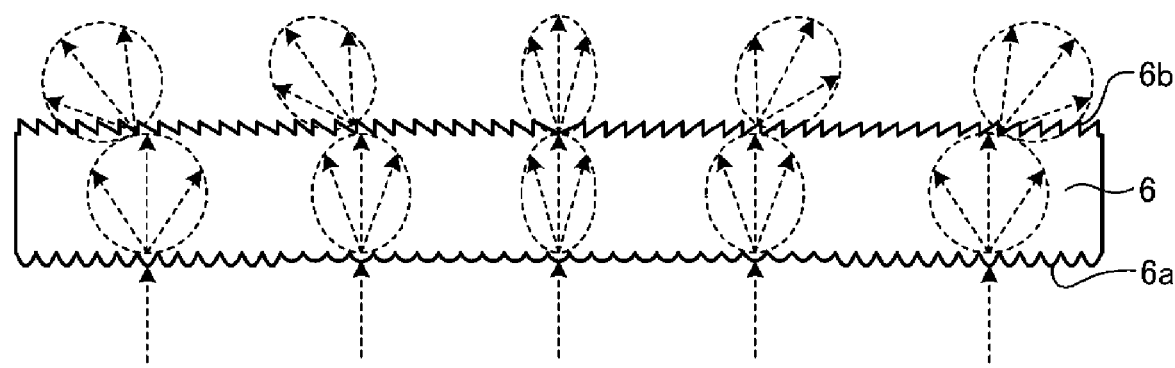
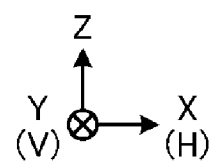
FIG. 26

PLANAR ILLUMINATION DEVICE

CROSS-REFERENCE TO RELATED APPLICATIONS

This application is a national stage entry of International Application No. PCT/JP2021/004566 filed on Feb. 8, 2021, which claims the benefit of priority to Japanese Application No. JP2020-114367, filed Jul. 1, 2020, the entire disclosures of which are hereby incorporated herein by reference.

TECHNICAL FIELD

The present invention relates to a planar illumination device.

BACKGROUND ART

A planar illumination device used as a backlight for a head-up display (HUD) or the like is required to have performances and functions such as high luminance, high contrast, high luminance uniformity, low power consumption, thinness, and support for local dimming. Particularly, since a backlight for a head-up display is required to have a high luminance of about 100 times a display such as a cluster or a center information display (CID) where a user directly sees a display screen, it is important to achieve high luminance.

On the other hand, some literatures disclose a direct backlight for a head-up display (for example, see PTL 1 to PTL 5 and the like).

CITATION LIST

Patent Literature

PTL 1: JP 2009-169399 A
PTL 2: JP 2019-20704 A
PTL 3: JP 2007-87792 A
PTL 4: JP 2012-203176 A
PTL 5: JP 2016-218391 A

SUMMARY OF INVENTION

Technical Problem

However, it has been difficult to simultaneously satisfy some of the above-described performances and functions such as high luminance, high contrast, high luminance uniformity, low power consumption, thinness, and support for local dimming.

The present invention has been made to solve the above-described problem, and an object of the present invention is to provide a planar illumination device capable of simultaneously satisfying some of performances and functions such as high luminance, high contrast, high luminance uniformity, low power consumption, thinness, and support for local dimming.

Solution to Problem

In order to solve the problem described above and achieve the object, a planar illumination device according to an aspect of the present invention includes a substrate, a first linear Fresnel lens, and a second linear Fresnel lens. The substrate includes a plurality of light sources disposed two-dimensionally in a grid pattern. The first linear Fresnel lens is disposed at an emission side of the plurality of light sources and formed with a groove constituting a concave-convex surface of the lens and extending in one direction. The second linear Fresnel lens is disposed at an emission side of the first linear Fresnel lens and formed with a groove constituting the concave-convex surface of the lens and extending in a direction orthogonal to the one direction. The first linear Fresnel lens is provided corresponding to one of rows or columns of the plurality of light sources disposed two-dimensionally in the grid pattern, and has a prism structure with a cylindrical convex lens as a Fresnel lens for each segment of a row or a column of a corresponding light source. The second linear Fresnel lens is provided corresponding to the other one of the rows or the columns, and has a prism structure with a cylindrical convex lens as a Fresnel lens for each segment of a row or a column of a corresponding light source.

A planar illumination device according to an aspect of the present invention can simultaneously satisfy some of performances and functions such as high luminance, high contrast, high luminance uniformity, low power consumption, thinness, and support for local dimming.

BRIEF DESCRIPTION OF DRAWINGS

FIG. 26 is a diagram illustrating a state of refraction of light rays in the horizontal direction by the field lens.

DESCRIPTION OF EMBODIMENTS

Figure 1:
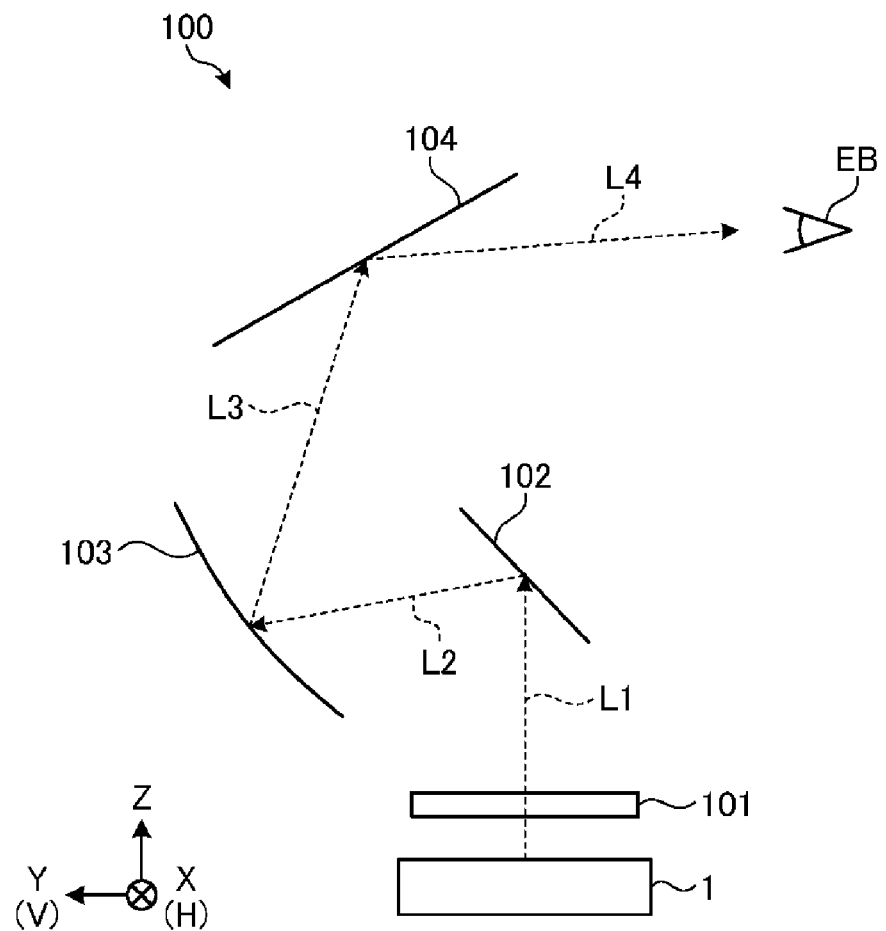
FIG. 1 is a diagram illustrating a configuration example of a head-up display system.

A planar illumination device according to embodiments is described below with reference to the drawings. Note that the present invention is not limited to the embodiment described above. Furthermore, the dimensional relationships between elements, proportions of the elements, and the like in the drawings may differ from reality. Among the drawings, parts having mutually different dimensional relationships and proportions may be included. Furthermore, the contents described in one embodiment or modification example are applied in principle to other embodiments or modification examples.

System Configuration

FIG. 1 is a diagram illustrating a configuration example of a head-up display system 100. In FIG. 1, in the case of the head-up display system 100 installed in an automobile, the traveling direction of the automobile is the left direction (positive direction of a Y-axis) in the drawing.

In FIG. 1, light emitted from a planar illumination device 1 passes through a liquid crystal panel 101 (L1), is reflected by a mirror 102 (L2), and is guided to a concave mirror 103. A screen 104 such as a windshield of the automobile is irradiated with light (L3) reflected from the concave mirror 103 at a screen 104 such as a windshield of the automobile, and reflected light (L4) enters an eye box (viewpoint) EB of a driver or the like, and an image drawn on a liquid crystal panel 101 is recognized as a virtual image. Note that the reason why "H (horizontal direction)" is written in an X-axis direction and V (perpendicular direction)" is written in a Y-axis direction is to indicate the correspondence between the horizontal direction and the perpendicular direction of a virtual image viewed from the eye box EB and the direction of an emitting surface of the planar illumination device 1, as will be described below.

First Embodiment

Figure 2:
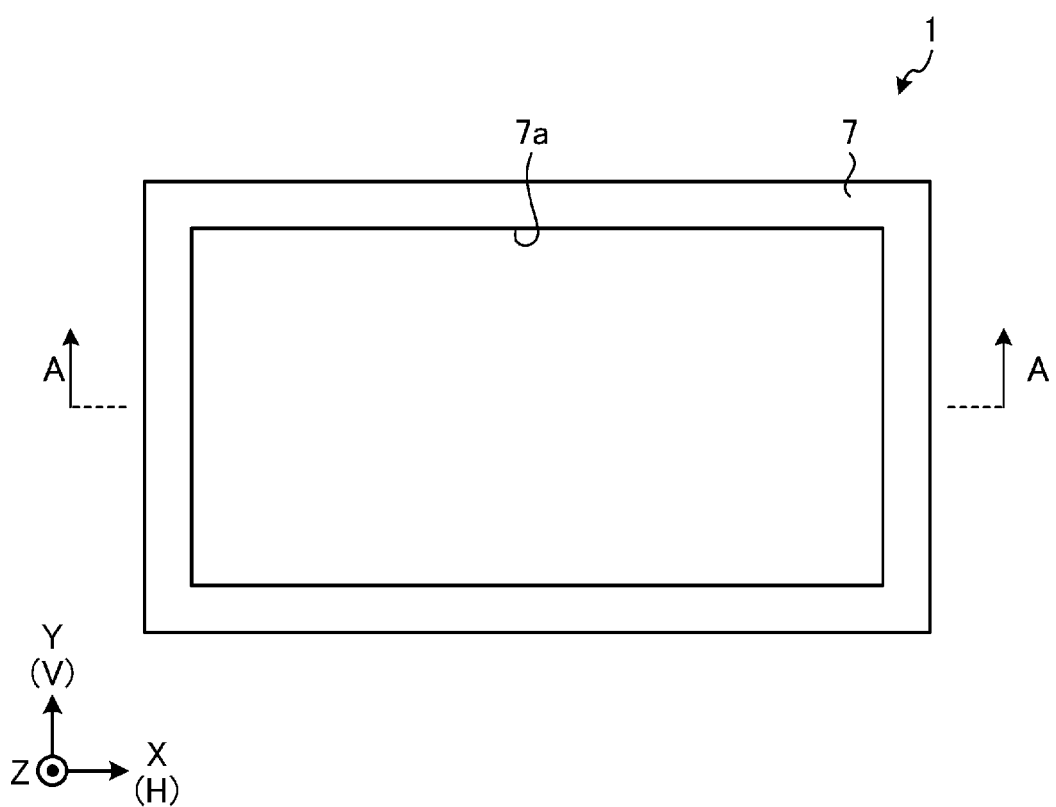
FIG. 2 is a front view of a planar illumination device 1 according to a first embodiment.

FIG. 2 is a front view of the planar illumination device 1 according to a first embodiment. For convenience, a light-emitting surface of the planar illumination device 1 is in an X-Y plane and the thickness direction of the planar illumination device 1 is defined as a Z direction. When light is reflected by a screen or the like as illumination for a head-up display and visible to a user, the X-axis direction corresponds to the horizontal direction H and the Y-axis direction corresponds to the perpendicular direction V, as illustrated in FIG. 1. Note that, in the following, the horizontal direction when light is reflected by the screen or the like and visible to the user is simply referred to as a "horizontal direction" and the perpendicular direction when light is reflected by the screen or the like and visible to the user is simply referred to as a "perpendicular direction".

In FIG. 2, the planar illumination device 1 has a substantially rectangular plate-like outer shape, and light is emitted from the inside of an opening 7a of a frame 7. The size of the opening 7a is, for example, 42 mm in, the X-axis direction and is 21 mm in the Y-axis direction. Note that the outer shape of the planar illumination device 1 is not limited to the rectangular plate shape illustrated in the drawing. The frame 7 may also be omitted.

Figure 3:
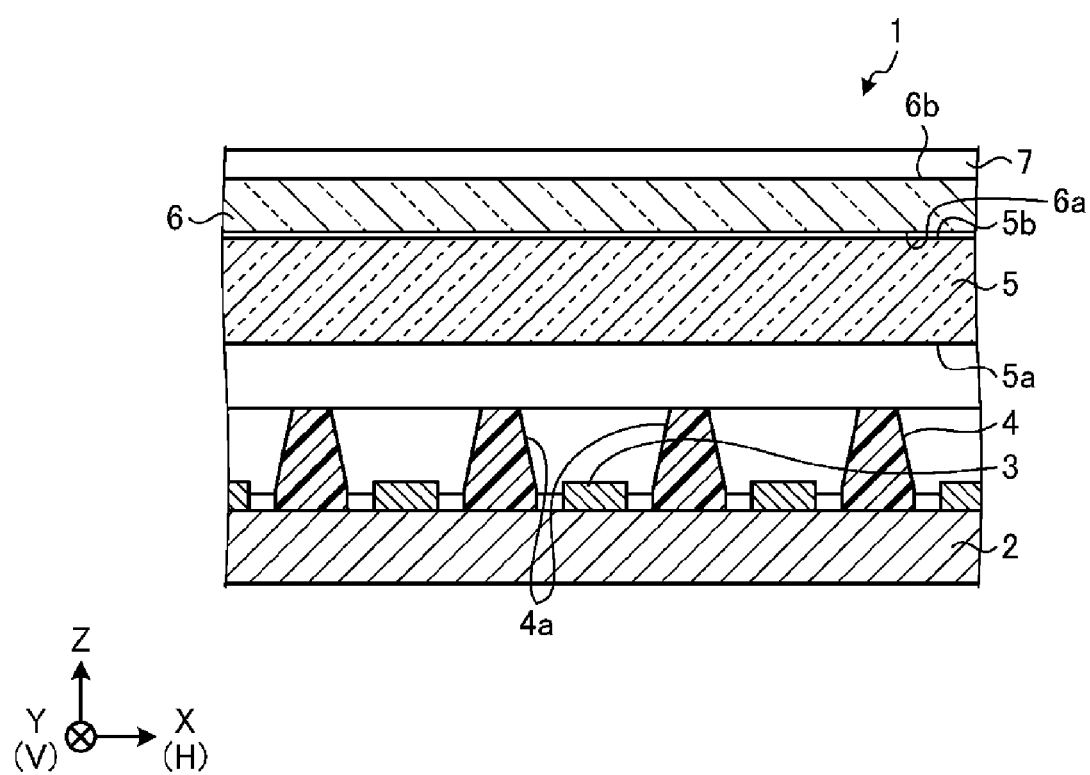
FIG. 3 is a cross-sectional view of the planar illumination device taken along line A-A in FIG. 2.

FIG. 3 is a cross-sectional view of the planar illumination device 1 taken along line A-A in FIG. 2. In FIG. 3, a plurality of light sources 3 such as light emitting diodes (LEDs) are disposed two-dimensionally in a grid pattern at a substrate 2 made of aluminum or the like having excellent heat dissipation properties after being appropriately insulated. The individual light sources 3 are individually driven and can cope with so-called local dimming.

Four reflectors 4 each including a reflecting surface 4a and surrounding each of the plurality of light sources 3 are disposed at an emission side of the substrate 2, and at the emission side, the light sources 3 are disposed. A peripheral edge of the reflector 4 has a frame shape thicker than the height of the reflecting surface 4a, and a space is provided at a leading end side of the reflecting surface 4a. Note that the reflecting surface 4a may extend to be in contact with a condenser lens 5 to be described below without providing a space at the leading end side of the reflecting surface 4a. The reflector 4 is made of resin or the like. Note that the reflectors 4 may be omitted.

The condenser lens 5 is disposed at an emission side of the reflector 4. The condenser lens 5 is formed at a lower surface 5a at an incident side in the drawing with a first linear Fresnel lens formed with a groove constituting a concave-convex surface of the lens and extending in one direction (depth direction (Y-axis direction) in the drawing in the present embodiment). Furthermore, the condenser lens 5 is formed at an upper surface 5b at an emission side in the drawing with a second linear Fresnel lens formed with a groove constituting a concave-convex surface of the lens and extending in a direction (left-right direction (X-axis direction) in the drawing in the present embodiment) orthogonal to the one direction of the surface 5a.

A field lens 6 is disposed at the emission side of the condenser lens 5 to change a light distribution and diffuse light. It is assumed that the field lens 6 changes the light distribution to the horizontal direction, and is formed from a prism formed with a groove extending in the depth direction (Y-axis direction), the prism being formed at a lower surface 6a of the field lens 6 in the drawing. A minute dot for diffusing light is formed across an entire surface of an upper surface 6b of the field lens 6 in the drawing. In FIG. 3, the frame 7 is visible at an end part of the opening 7a (FIG. 2) rather than in cross section. One peripheral edge of the condenser lens 5 or the field lens 6 has a thick frame shape, and a gap is provided between the condenser lens 5 and the field lens 6 except for the peripheral edge. A frame-shaped spacer may be provided between the condenser lens 5 and the field lens 6 separately from the condenser lens 5 or the field lens 6.

Figure 4:
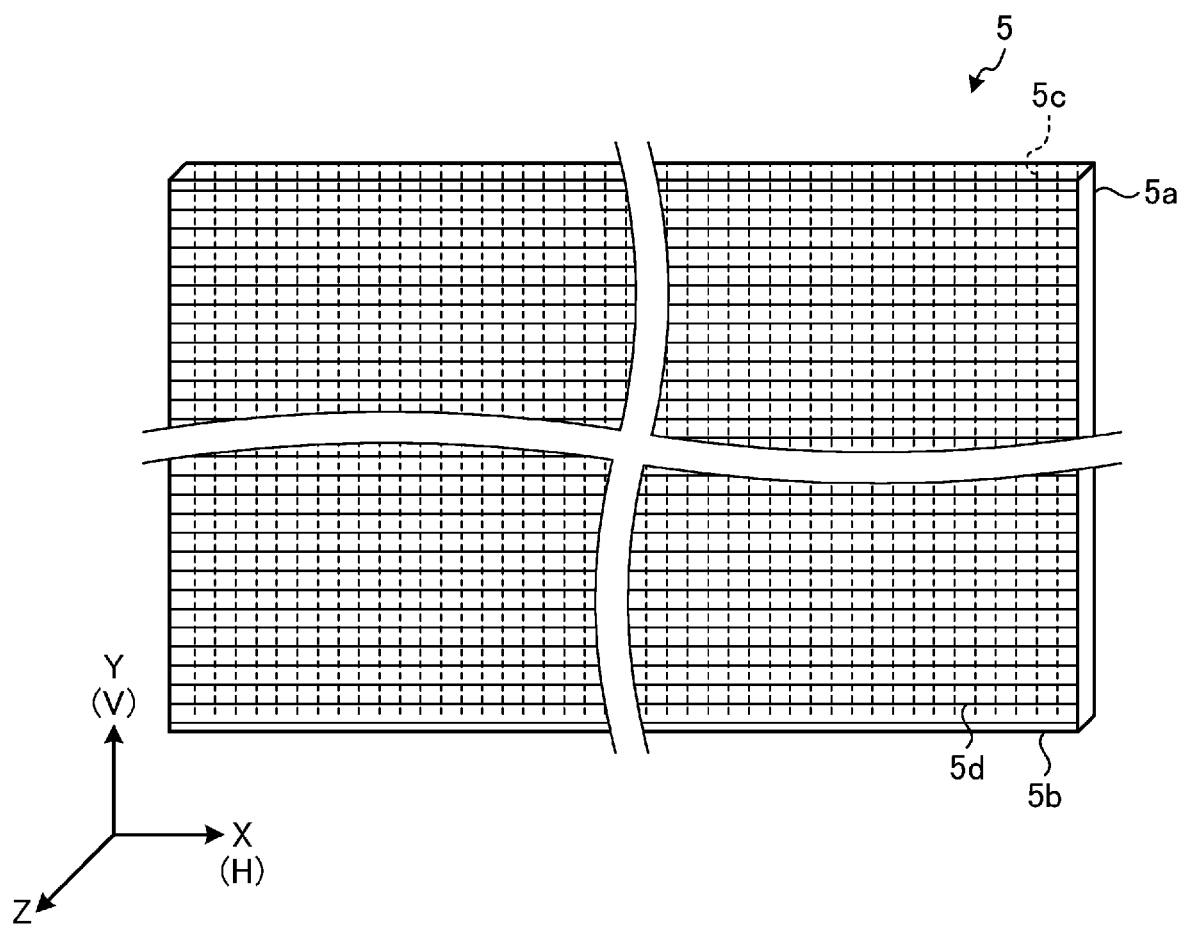
FIG. 4 is a schematic diagram of a groove provided at both surfaces of a condenser lens.
Figure 5:
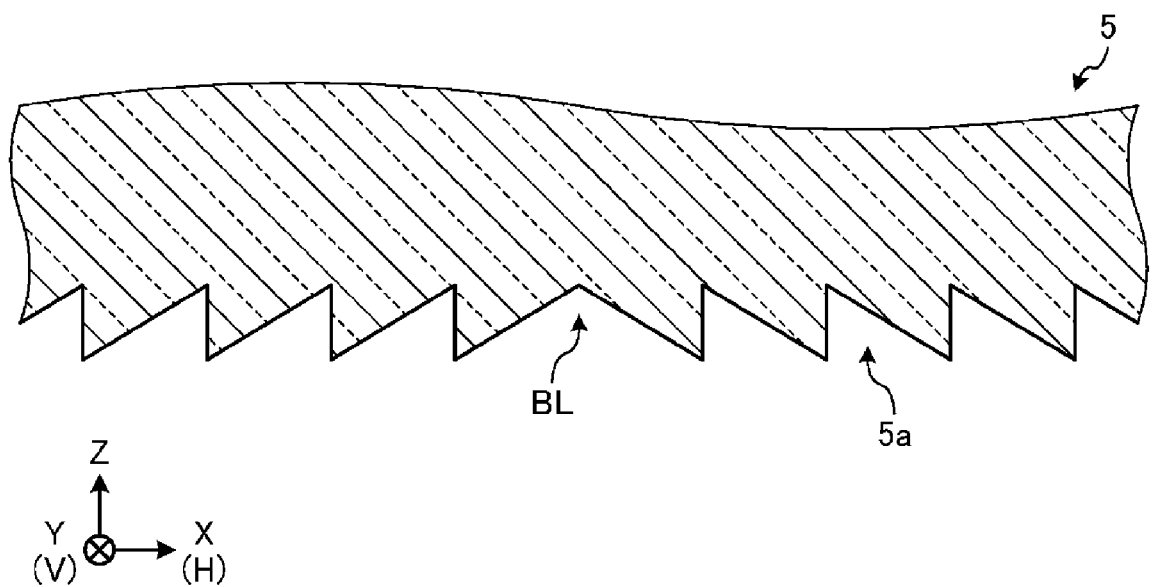
FIG. 5 is a diagram illustrating an example of a cross-sectional configuration at an incident side of the condenser lens.

FIG. 4 is a schematic diagram of grooves 5c and 5d provided at both surfaces of the condenser lens 5. The groove 5c constituting the first linear Fresnel lens and extending in the Y-axis direction is formed at the surface 5a at the lower side (incident side) of the condenser lens 5. The groove 5d constituting the second linear Fresnel lens and extending in the X-axis direction is formed at the surface 5b at the upper side (emission side) of the condenser lens 5. FIG. 5 is a diagram illustrating an example of a cross-sectional configuration at the incident side of the condenser lens 5. The surface 5a at the incident side of the condenser lens 5 has a prism structure with a cylindrical convex lens as a Fresnel lens for each segment corresponding to the light source 3 (FIG. 3), and has a groove extending in the depth direction (Y-axis direction) in the drawing. An angle of the prism is reversed at a segment boundary BL between adjacent segments. The extending direction of the groove is orthogonal to the emission side of the condenser lens 5, but the same prism structure is provided.

In the first and second linear Fresnel lenses, grooves are periodically formed in accordance with the pitch (pitch in the X-axis direction in the first linear Fresnel lens and pitch in the Y-axis direction in the second linear Fresnel lens) of the light sources 3 (FIG. 3) disposed directly below the first and second linear Fresnel lenses. During assembling, the condenser lens 5 is disposed so that the center of the lens is located directly above the light source 3 in each of the Y-axis direction and the X-axis direction. It is difficult to form annular Fresnel lenses corresponding to the number of light sources according to the locations of the individual light sources, but it is relatively easy to form linear Fresnel lenses with a straight shape in the unit of columns or rows in accordance with a plurality of linearly arranged light sources. By forming the linear Fresnel lenses to be orthogonal to both surfaces of a transparent substrate, an intersection point between the center of one linear Fresnel lens and the center of the other linear Fresnel lens acts as a Fresnel lens corresponding to the center of the light source.

Figure 6:
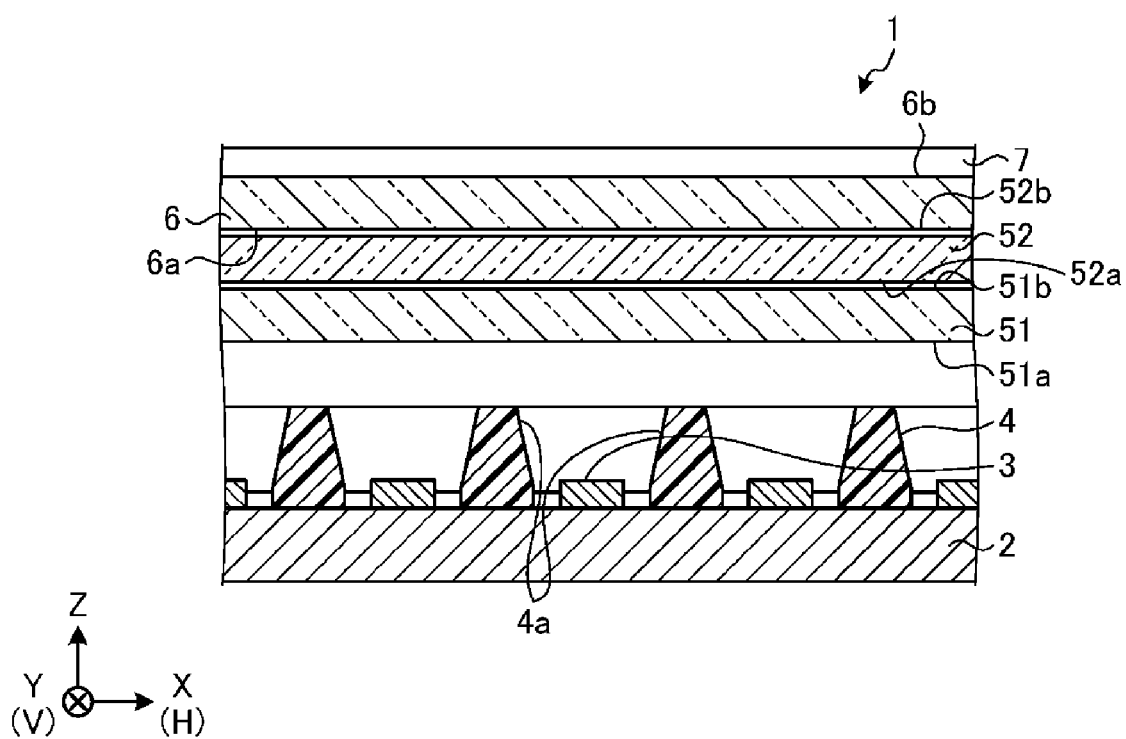
FIG. 6 is a cross-sectional view illustrating another configuration example of the planar illumination device taken along line A-A.

FIG. 6 is a cross-sectional view illustrating another configuration example of the planar illumination device 1 taken along line A-A. FIG. 6 is different from the configuration of FIG. 3 in that the condenser lens 5 includes two condenser lenses 51, 52, and other configurations are the same. Note that there are several patterns depending on a combination of whether a groove of a Fresnel lens is provided at either a lower surface 51a or an upper surface 51b of the condenser lens 51 and a groove of a Fresnel lens is provided at either a lower surface 52a or an upper surface 52b of the condenser lens 52. One peripheral edge of each of the condenser lenses 51 and 52 has a thick frame shape, and a gap is provided between the condenser lenses 51 and 52 except the peripheral edge. A frame-shaped spacer may be provided between the condenser lenses 51 and 52 separately from the condenser lenses 51 and 52.

According to the configuration as in FIG. 6, since a linear Fresnel lens is configured at one side of a transparent base material, the manufacturing becomes easier. When a pitch of the light source in the X-axis direction and a pitch of the light source in the Y-axis direction are the same, since one type of large linear Fresnel lens may be manufactured and cut out for use while changing the direction, manufacturing becomes easier.

Figure 7:
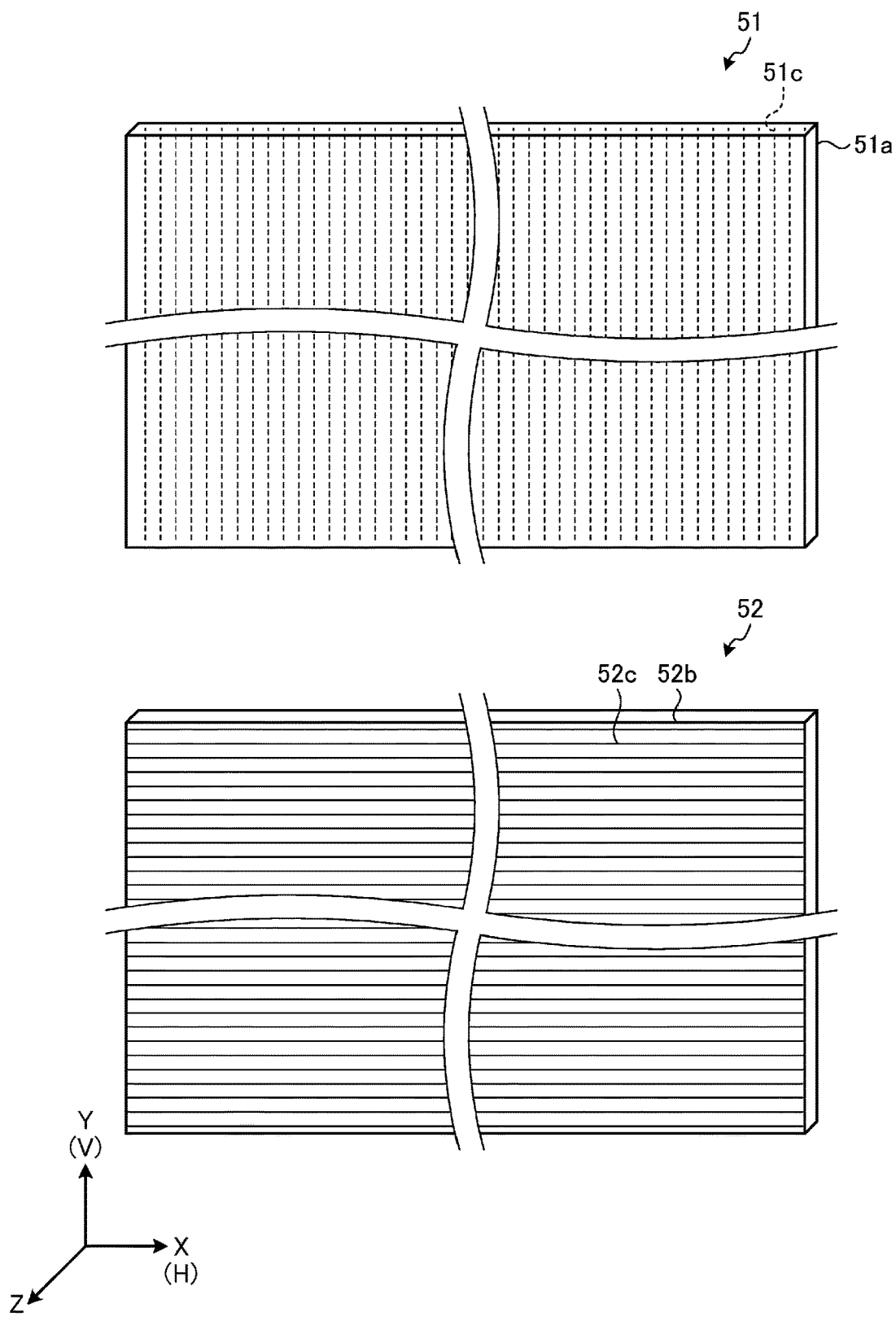
FIG. 7 is a schematic diagram of grooves provided at one side of each of condenser lenses.

FIG. 7 is a schematic diagram of grooves 51c and 52c provided at one side of each of the condenser lenses 51 and 52. In FIG. 7, the groove 51c extending in the Y-axis direction is provided at the lower surface 51a of the lower condenser lens 51, and the Fresnel lens groove 52c extending in the X-axis direction is provided at the upper surface 52b of the upper condenser lens 52.

Figure 8A:
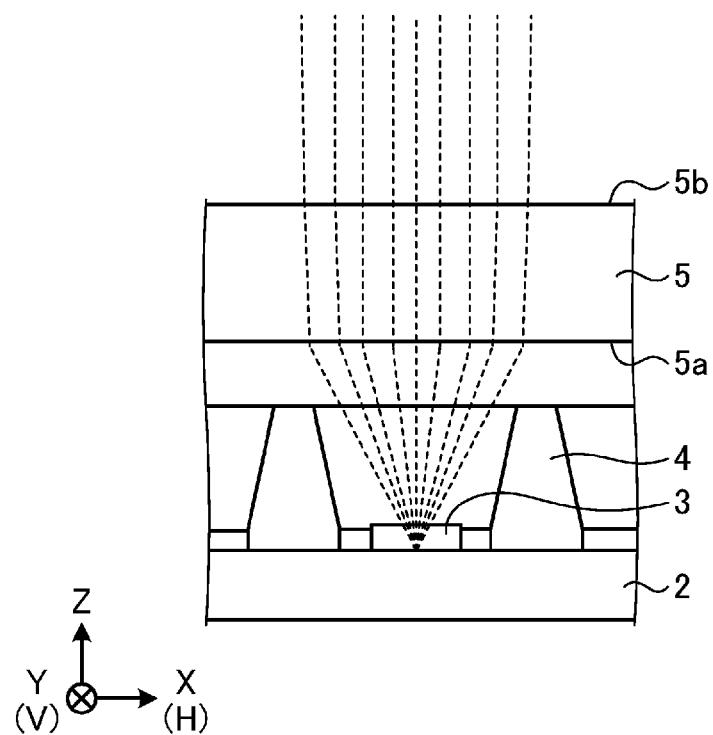
FIG. 8A is a diagram illustrating a state of refraction of light rays in a horizontal direction by the condenser lens.
Figure 8B:
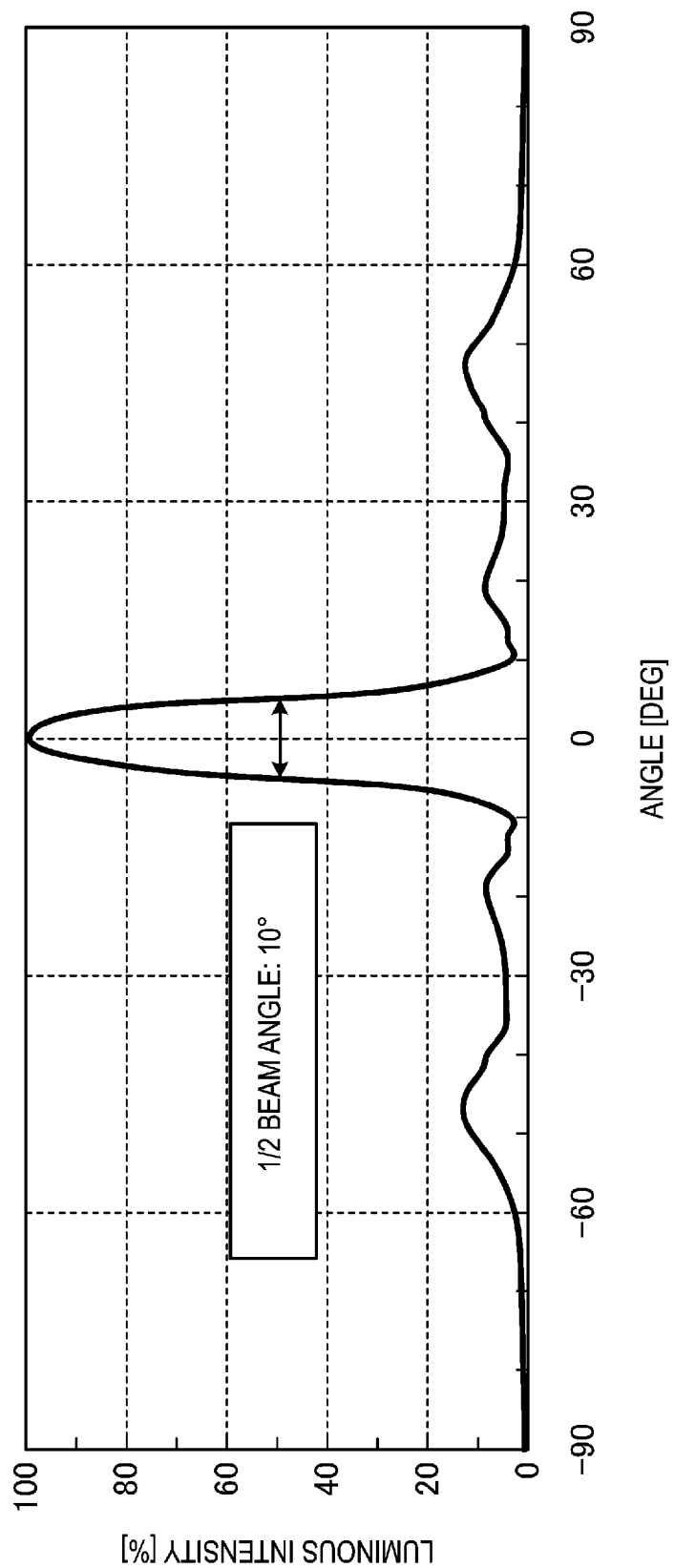
FIG. 8B is a diagram illustrating an example of directional characteristics of luminous intensity of light in the horizontal direction.

FIG. 8A is a diagram illustrating a state of refraction of light rays in the horizontal direction by the condenser lens 5. That is, FIG. 8A illustrates the behavior of light in a cross section along the horizontal direction (X, H) and the normal direction (Z) of the emitting surface during use. The field lens 6 is not illustrated. In FIG. 8A, the light emitted from the light source 3 and indicated by the broken line is refracted in the X-Z plane by the first linear Fresnel lens having the concave-convex surface formed from the groove provided at the lower surface 5a of the condenser lens 5 and extending in the Y-axis direction, and becomes substantially parallel light. Note that the light becomes parallel light along the normal direction of the emitting surface, but may be parallel light with a predetermined tilt with respect to the normal direction of the emitting surface. Since the second linear Fresnel lens having the concave-convex surface formed from the groove provided at the upper surface 5b of the condenser lens 5 and extending in the X-axis direction does not act in the horizontal direction, the light having become substantially parallel light is emitted as is. FIG. 8B is a diagram illustrating an example of directional characteristics of luminous intensity of light in the horizontal direction, and an angle range (½ beam angle) is about 10°. In this angle range, an intensity corresponding to about half of a peak is maintained.

Figure 9A:
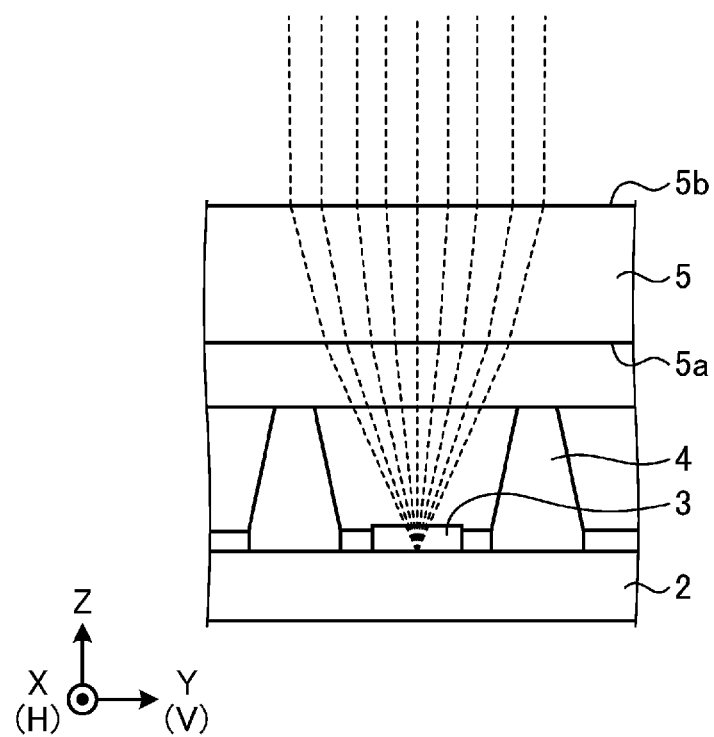
FIG. 9A is a diagram illustrating a state of refraction of light rays in a perpendicular direction by the condenser lens.
Figure 9B:
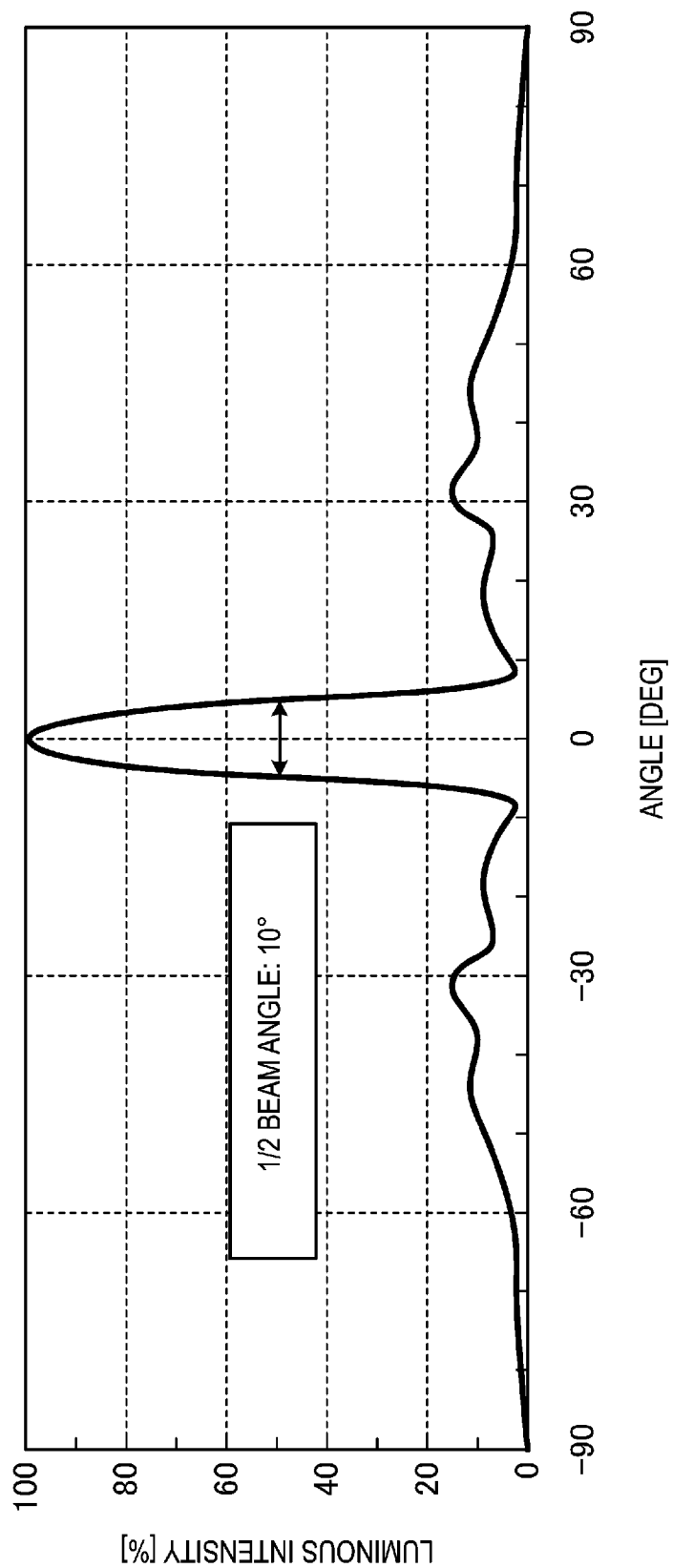
FIG. 9B is a diagram illustrating an example of directional characteristics of luminous intensity of light in the perpendicular direction.

FIG. 9A is a diagram illustrating a state of refraction of light rays in the perpendicular direction by the condenser lens 5. That is, FIG. 9A illustrates the behavior of light in a cross section along the perpendicular direction (Y, V) and the normal direction (Z) of the emitting surface during use. The field lens 6 is not illustrated. In FIG. 9A, the light emitted from the light source 3 and indicated by the broken line is not strongly refracted by the first linear Fresnel lens provided at the lower surface 5a of the condenser lens 5, and proceeds to the inside of the condenser lens 5 almost as is. Then, the light is refracted in the Y-Z plane by the second linear Fresnel lens having the concave-convex surface formed from the groove provided at the upper surface 5b of the condenser lens 5 and extending in the X-axis direction, becomes substantially parallel light, and is emitted. Note that the light becomes parallel light along the normal direction of the emitting surface, but may be parallel light with a predetermined tilt with respect to the normal direction of the emitting surface. FIG. 9B is a diagram illustrating an example of directional characteristics of luminous intensity of light in the perpendicular direction, and an angle range (½ beam angle) is about 10°. In this angle range, an intensity corresponding to about half of a peak is maintained.

Figure 10:
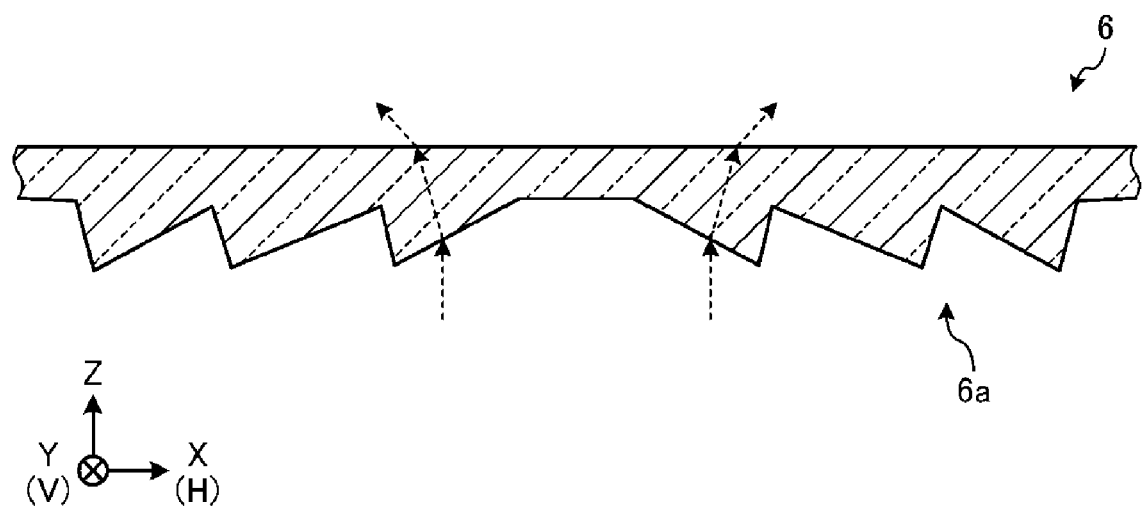
FIG. 10 is a diagram illustrating an example of a cross-sectional configuration at an incident side of a field lens.

FIG. 10 is a diagram illustrating an example of a cross-sectional configuration at an incident side of the field lens 6. In FIG. 10, one cross section of the surface 6a at the incident side of the field lens 6 has a prism structure equivalent to a structure with a ring-shaped concave lens as a Fresnel lens, the prism structure serving as a linear prism, and includes a groove extending in the depth direction (Y-axis direction) in the drawing. A tilt angle of the prism is steep as away from the center.

Figure 11:
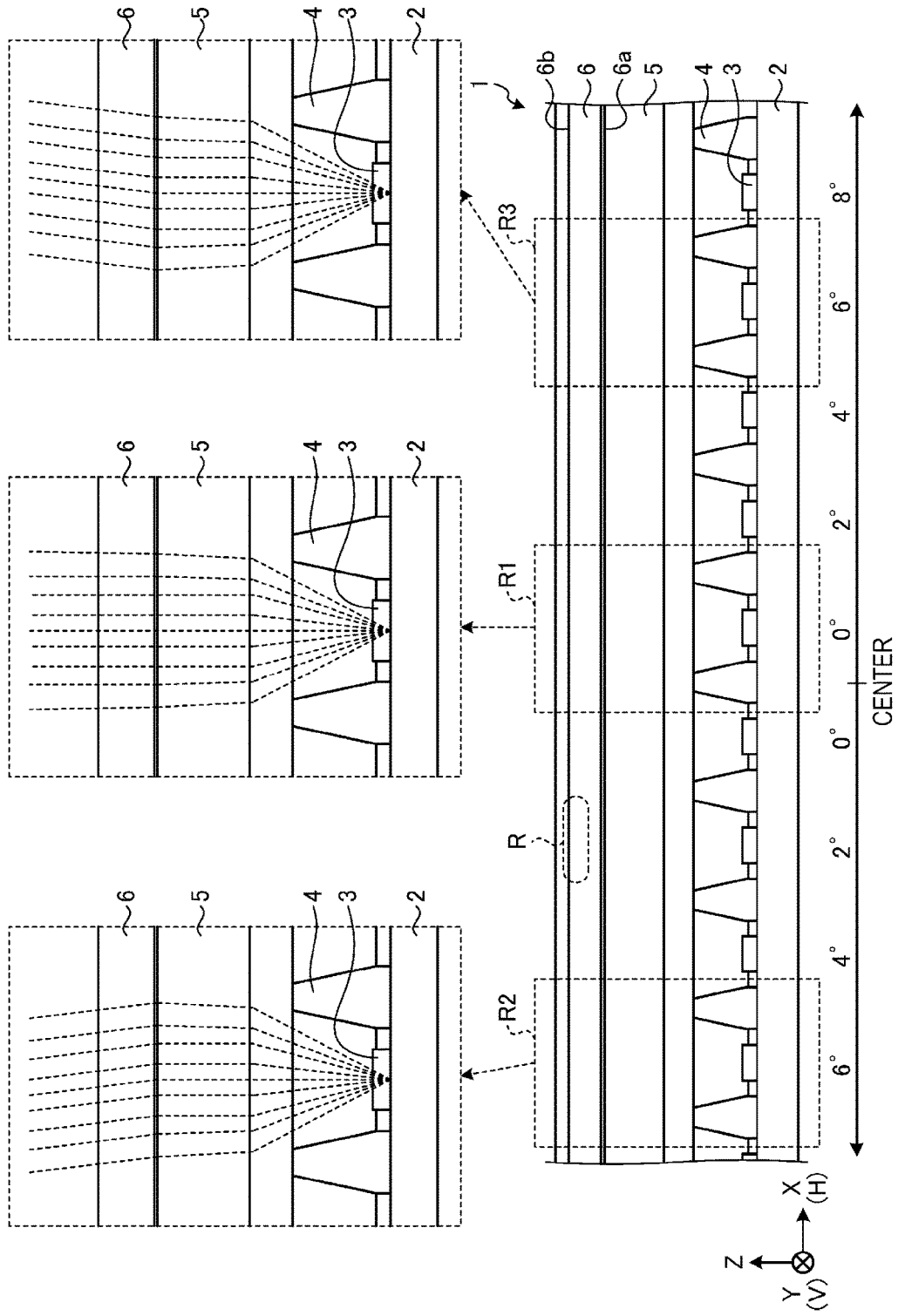
FIG. 11 is a diagram illustrating a state of refraction of light rays in the horizontal direction by the field lens.

FIG. 11 is a diagram illustrating a state of refraction of light rays in the horizontal direction by the field lens 6. That is, FIG. 11 illustrates the behavior of light in a cross section along the horizontal direction (X, H) and the normal direction (Z) of the emitting surface during use. In the head-up display or the like as illustrated in FIG. 1, light from the planar illumination device 1 as a backlight for the liquid crystal panel 101 is reflected at the screen 104 via the mirror 102 or the concave mirror 103, and enters the eye of a user. Since an optical axis of the light reflected by the concave mirror 103 is tilted inward, it is necessary to supply light with an outer optical axis tilted outward with respect to the center from the planar illumination device 1 in order to secure an angle range of an optical axis required for emitted light from the concave mirror 103. Note that the optical axis is an axis along the direction of the highest intensity of light emitted from one light source or a minute portion (regardless of whether the light is parallel light or radiated light). Therefore, the optical axis is tilted outward in the horizontal direction according to a distance in the horizontal direction from the center of the planar illumination device 1. Thus, the angle range of the optical axis required for emitted light from the concave mirror 103 can be secured, and an end part of a virtual image can be prevented from being invisible.

Note that also in the perpendicular direction, it is necessary to tilt an outer optical axis outward according to the curvature of the concave mirror 103, but since the tilt of the optical axis in the perpendicular direction with respect to the horizontal direction is generally less, the light becomes substantially parallel light in this embodiment. When the optical axis in the perpendicular direction also needs to be tilted, the optical axis in the perpendicular direction is also tilted. An example of tilting the optical axis in the perpendicular direction is described below. Note that as for the tilting of the optical axis, the center may be tilted in a predetermined direction rather than substantially parallel light, and both sides of the optical axis may be tilted outward with respect to the tilt of the center.

A lower side in FIG. 11 indicates the cross-sectional configuration of the planar illumination device 1 similarly to FIG. 3, tilt angles of two light sources 3 near the center of the planar illumination device 1 are each 0°, tilt angles of the light sources 3 next to the two light sources 3 are each changed to 2°, and tilt angles of the light sources 3 next to the previous light sources 3 are each changed to 4°. The numerical values of the tilt angles illustrated in the drawing are merely examples. Note that the tilt angle is determined by the shape of the prism constituting the field lens 6.

In FIG. 11, in a region R1 near the center, the tilt angle is 0°, and light is emitted in the front direction (normal direction) of the field lens 6 as illustrated in an enlarged view at an upper side in the drawing. In a region R2 located at the left side from the center, the tilt angle is 6°, and as illustrated in the enlarged view at the upper side in the drawing, light tilted to the left with respect to the front direction of the field lens 6 is emitted. In a region R3 located at the right side from the center, the tilt angle is 6°, and as illustrated in the enlarged view at the upper side in the drawing, light tilted to the right with respect to the front direction of the field lens 6 is emitted. Note that in FIG. 11, the tilt angle is changed for each light source 3, but the tilt angle may be changed for each region including the plurality of light sources 3.

Figure 12:
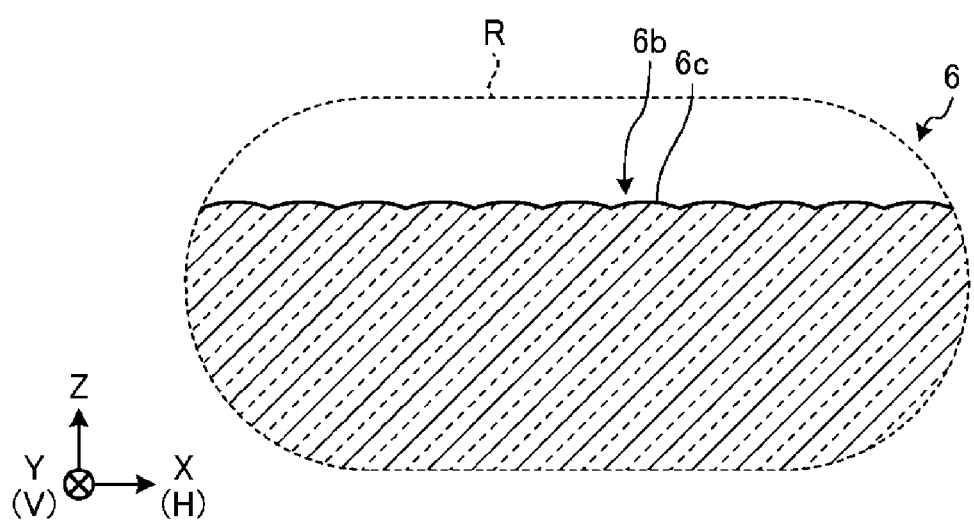
FIG. 12 is an enlarged view illustrating a dot provided at the other surface of the field lens.
Figure 13:
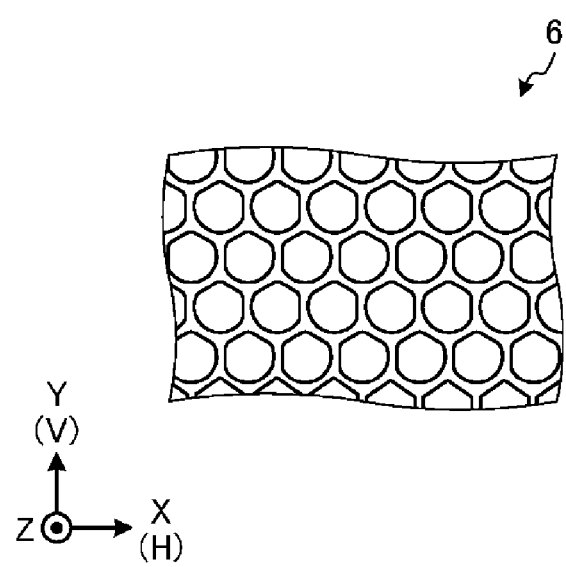
FIG. 13 is a diagram illustrating an example of a surface configuration at an emission side of the field lens.

FIG. 12 is an enlarged view (enlarged view of the region R in FIG. 11) illustrating a dot 6c provided at the other surface 6b of the field lens 6. FIG. 13 is a diagram illustrating an example of a surface configuration at an emission side of the field lens 6. In FIGS. 12 and 13, the minute dot 6c formed from a mold or the like formed by laser processing or the like is formed at the upper surface 6b of the field lens 6 in the drawing. The minute dot 6c diffuses light passing through the field lens 6 to improve luminance uniformity.

For the dot 6c, for example, a simulation was performed for a hexagonal arrangement, a dot outer shape of 35 μm, and dot contact angles of 5°, 10°, 15°, and 20°. Note that dot heights are 0.8 μm, 1.5 μm, 2.3 μm, and 3.1 μm at the dot contact angles of 5°, 10°, 5°, and 20°, respectively.

As a result of the simulation, the greater the dot contact angle (for example, 15° than the dot contact angle 10°), the higher the luminance uniformity and the wider the light distribution angle. It was also confirmed that for the same power consumption of the light source 3, the lesser the dot contact angle (for example, 10° than the dot contact angle of 15°), the higher the average luminance. For the field lens 6, a general diffusion sheet separate from the field lens 6 may be used instead of the dot provided at the other surface 6b.

Second Embodiment

In the first embodiment illustrated in FIG. 3, the light distribution of light made almost parallel by passing through the condenser lens 5 is adjusted in the horizontal direction by the field lens 6; however, when the light distribution of light emitted from the condenser lens 5 is too narrow, the luminance uniformity may be deteriorated. That is, the luminance of a peripheral portion may be reduced too much compared to a center portion. Therefore, in the second embodiment, the light distribution of the light emitted from the condenser lens 5 in the horizontal direction and the perpendicular direction is spread.

Figure 14:
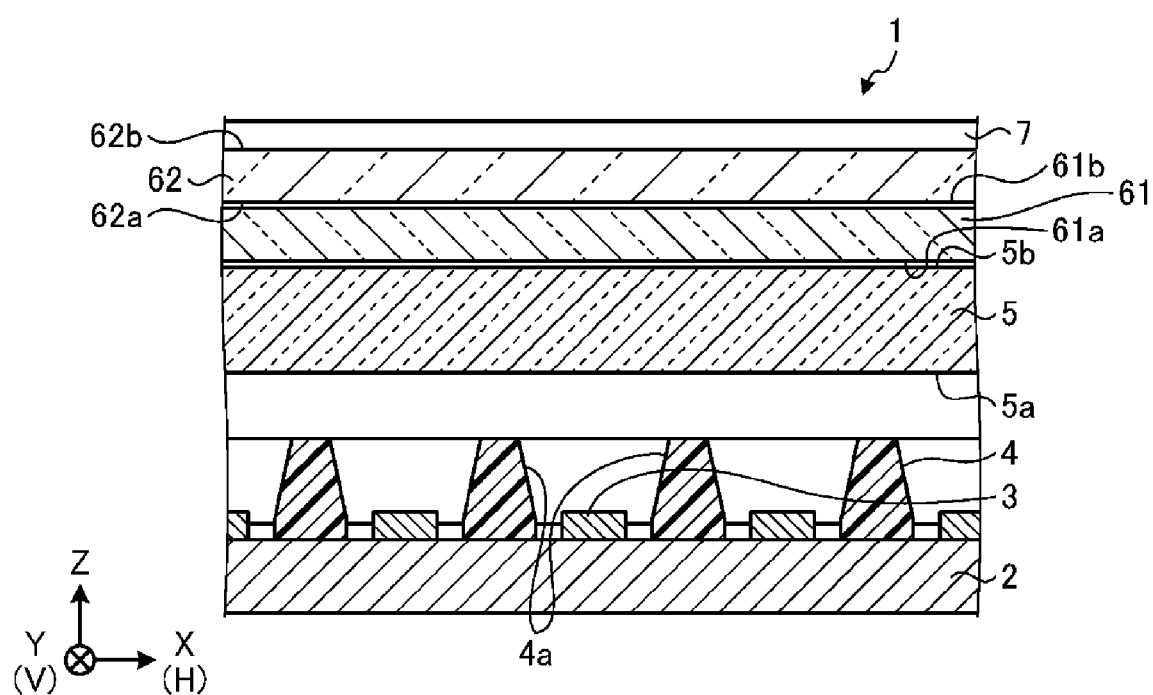
FIG. 14 is a cross-sectional view of the planar illumination device according to a second embodiment.

FIG. 14 is a cross-sectional view of the planar illumination device 1 according to the second embodiment. In FIG. 14, the field lens 6 in FIG. 3 is a second field lens 62 as is, and a first field lens 61 is disposed between the condenser lens 5 and the second field lens 62. The first field lens 61 is formed at a lower surface 61a at an incident side in the drawing with a first lenticular lens formed with a groove constituting a concave-convex surface of the lens and extending in one direction (depth direction (Y-axis direction) in the drawing in the present embodiment). Furthermore, the field lens 61 is formed at an upper surface 61b at an emission side in the drawing with a second lenticular lens formed with a groove constituting a concave-convex surface of the lens and extending in a direction (left-right direction (X-axis direction) in the drawing in the present embodiment) orthogonal to the one direction of the surface 61a. The lenticular lens is a linear lens with a semicylindrical cross section. The second field lens 62 has a prism structure for changing the light distribution to the surface 62a at the incident side and a dot is formed at the surface 62b at the emission side, like the field lens 6 in FIG. 3. Similarly to FIG. 6, the condenser lens 5 may have a dual configuration of the condenser lenses 51 and 52.

Figure 15:
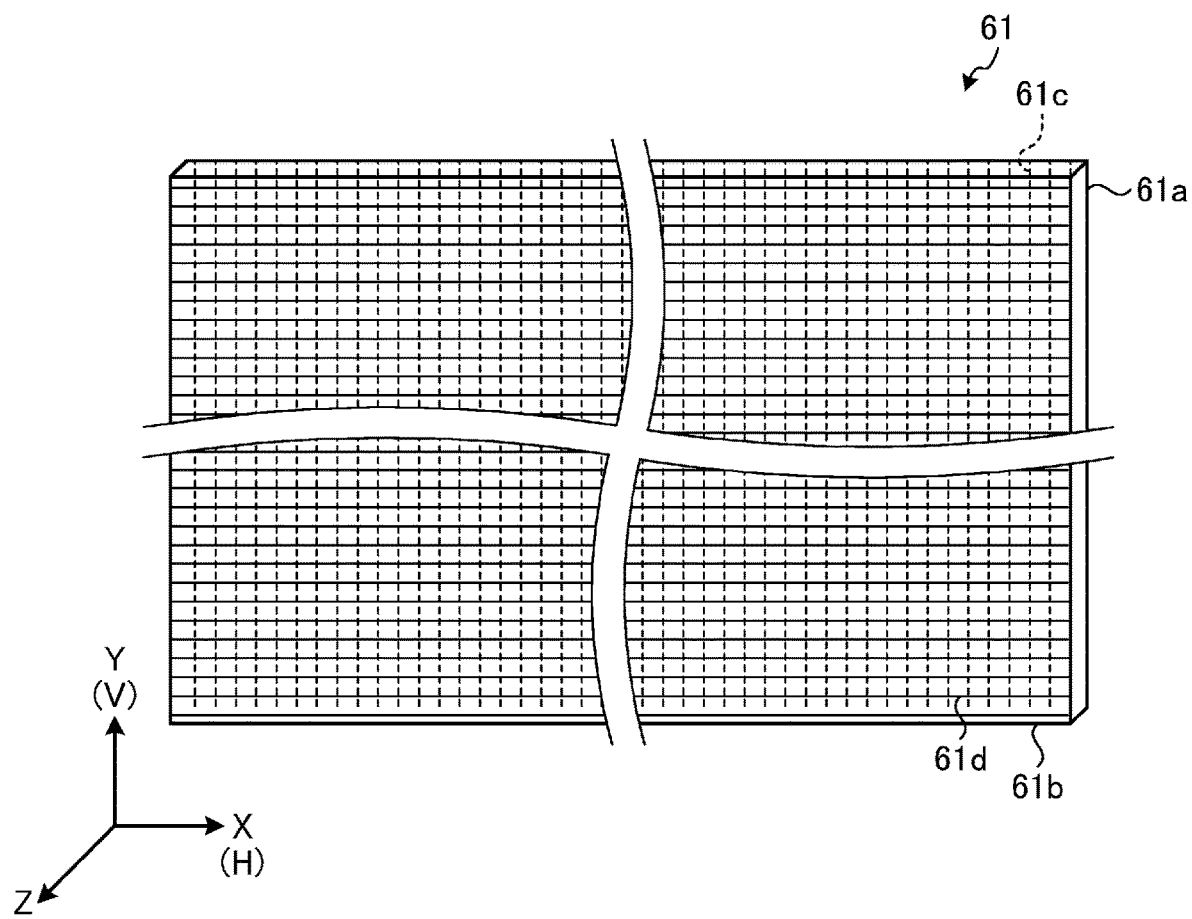
FIG. 15 is a schematic diagram of a groove provided at both surfaces of a first field lens.
Figure 16:
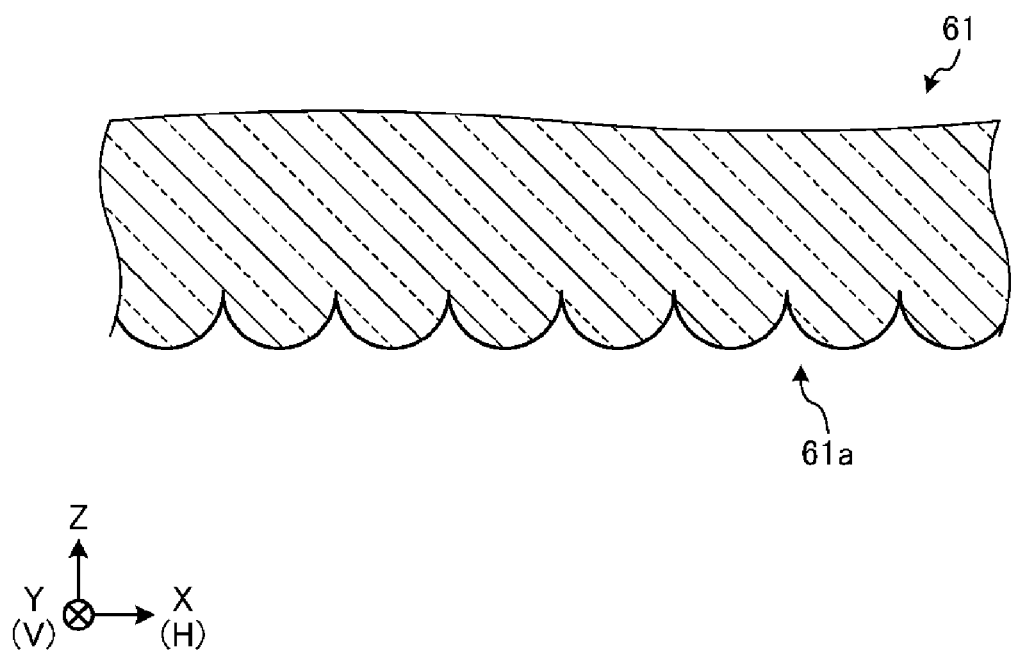
FIG. 16 is a diagram illustrating an example of a cross-sectional configuration at an incident side of the first field lens.

FIG. 15 is a schematic diagram of grooves 61c and 61d provided at both surfaces of the first field lens 61. The groove 61c constituting the first lenticular lens and extending in the Y-axis direction is formed at the surface 61a at the lower side (incident side) of the field lens 61. The groove 61d constituting the second lenticular lens and extending in the X-axis direction is formed at the surface 61b at the upper side (emission side) of the field lens 61. FIG. 16 is a diagram illustrating an example of a cross-sectional configuration at the incident side of the first field lens 61. The surface 61a at the incident side of the first field lens 61 has a linear first lenticular lens with a semicylindrical (R-shaped) cross section. The extending direction of the groove is orthogonal to the emission side of the first field lens 61, but a second lenticular lens having the same structure is provided.

Figure 17:
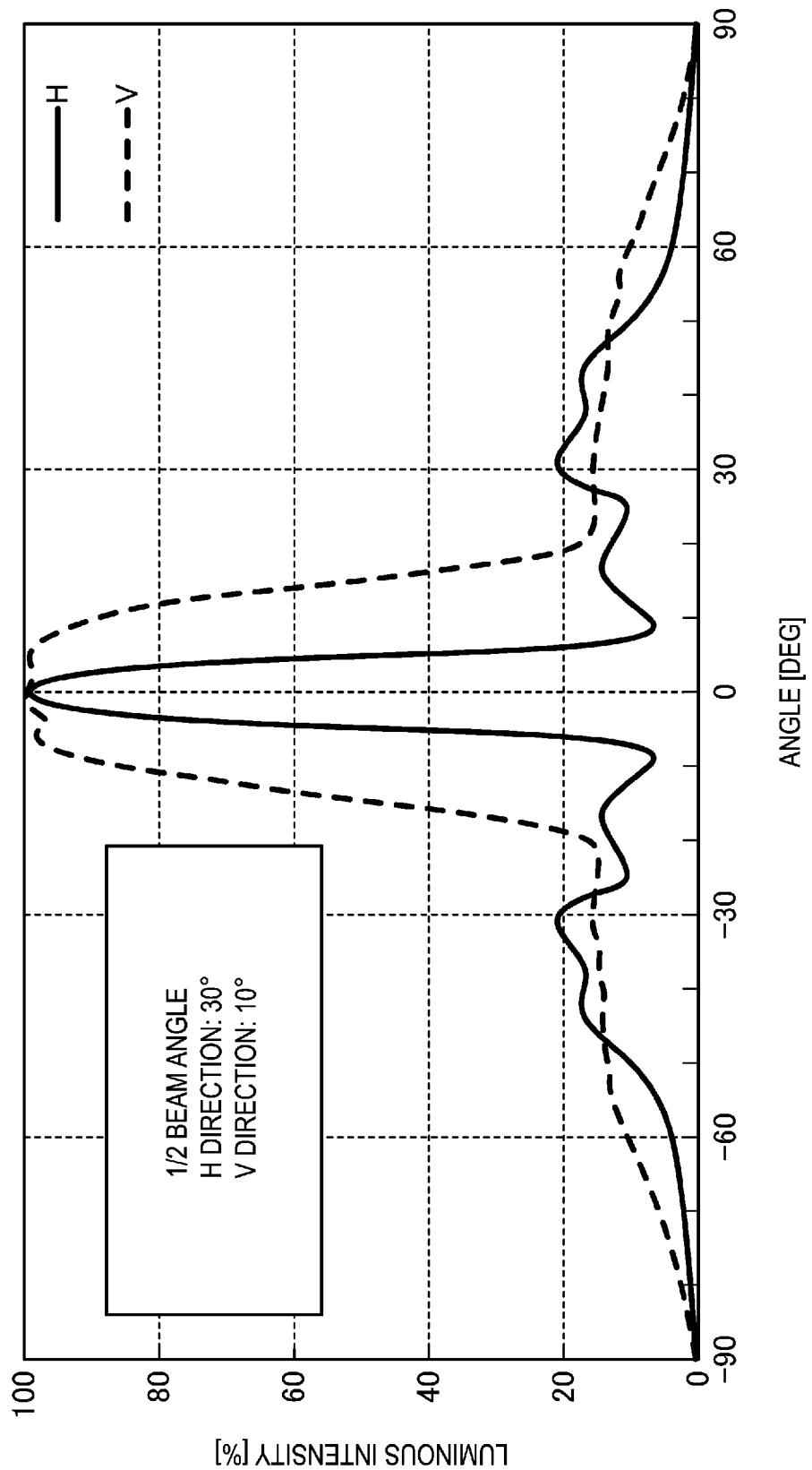
FIG. 17 is a diagram illustrating an example of directional characteristics of luminous intensity of light in the horizontal direction and the perpendicular direction after passing through the first field lens.

FIG. 17 is a diagram illustrating an example of directional characteristics of luminous intensity of light in the horizontal direction and the perpendicular direction after passing through the first field lens 61. The first lenticular lens at the incident side of the first field lens 61 acts in the horizontal direction (H), and the second lenticular lens at the emission side acts in the perpendicular direction (V). The lenticular lens is an assembly of linear convex lenses, and substantially parallel light incident from the condenser lens 5 is condensed and intersects to become light with a spread. According to FIG. 17, a ½ beam angle 10° (FIG. 8B) of light in the horizontal direction from the condenser lens 5 is spread to 30° and a ½ beam angle 10° (FIG. 9B) of light in the perpendicular direction is spread to 13°.

Figure 18:
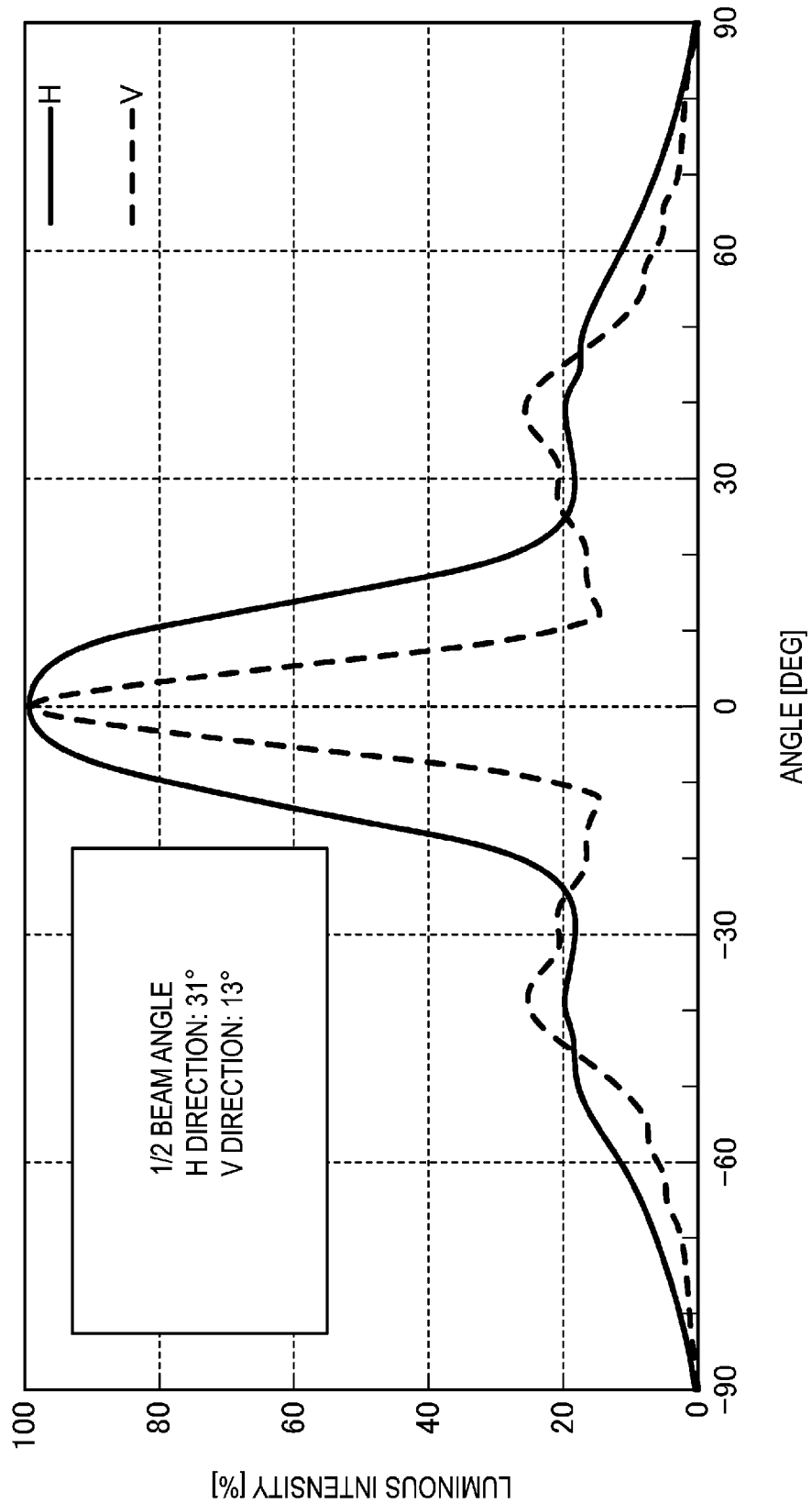
FIG. 18 is a diagram illustrating an example of directional characteristics of luminous intensity of light in the horizontal direction and the perpendicular direction after passing through a second field lens.

Next, the light distribution of light passing through the first field lens 61 is adjusted in the horizontal direction by the second field lens 62. FIG. 18 is a diagram illustrating an example of directional characteristics of luminous intensity of light in the horizontal direction and the perpendicular direction after passing through the second field lens 62. According to FIG. 18, a ½ beam angle 30° (FIG. 17) of light in the horizontal direction from the first field lens 61 is slightly spread to 31°. A ½ beam angle of light in the light in the perpendicular direction remains unchanged at 13.0°.

Third Embodiment

In the third embodiment, the second embodiment has been improved, the main functions of the field lenses 61 and 62 in the second embodiment (FIG. 14) are achieved, by one field lens 63, and the number of main components is easily reduced.

Figure 19:
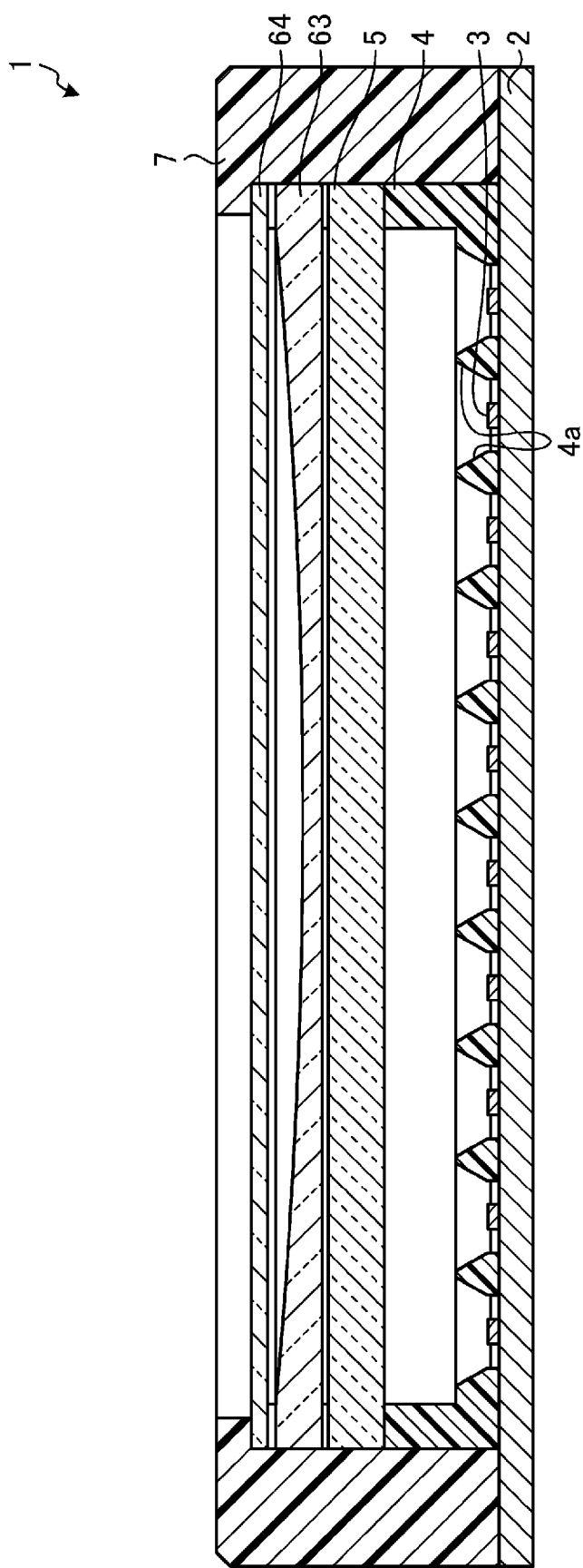
FIG. 19 is a cross-sectional view of the planar illumination device according to a third embodiment.

FIG. 19 is a cross-sectional view of the planar illumination device 1 according to the third embodiment. FIG. 19 is different from FIG. 14 in that the field lenses 61 and 62 are replaced with the field lens 63 and a diffusion plate 64. That is, the emission side of the field lens 61 has a concave shape across substantially the entire emitting surface of the planar illumination device 1, so that the prism structure at the incident side of the field lens 62 is not required. Furthermore, the diffusion dot provided at the emission side of the field lens 62 is replaced with the diffusion plate 64. Note that the diffusion plate 64 may move outside the frame 7 or may be omitted when diffusion is unnecessary.

Figure 20:
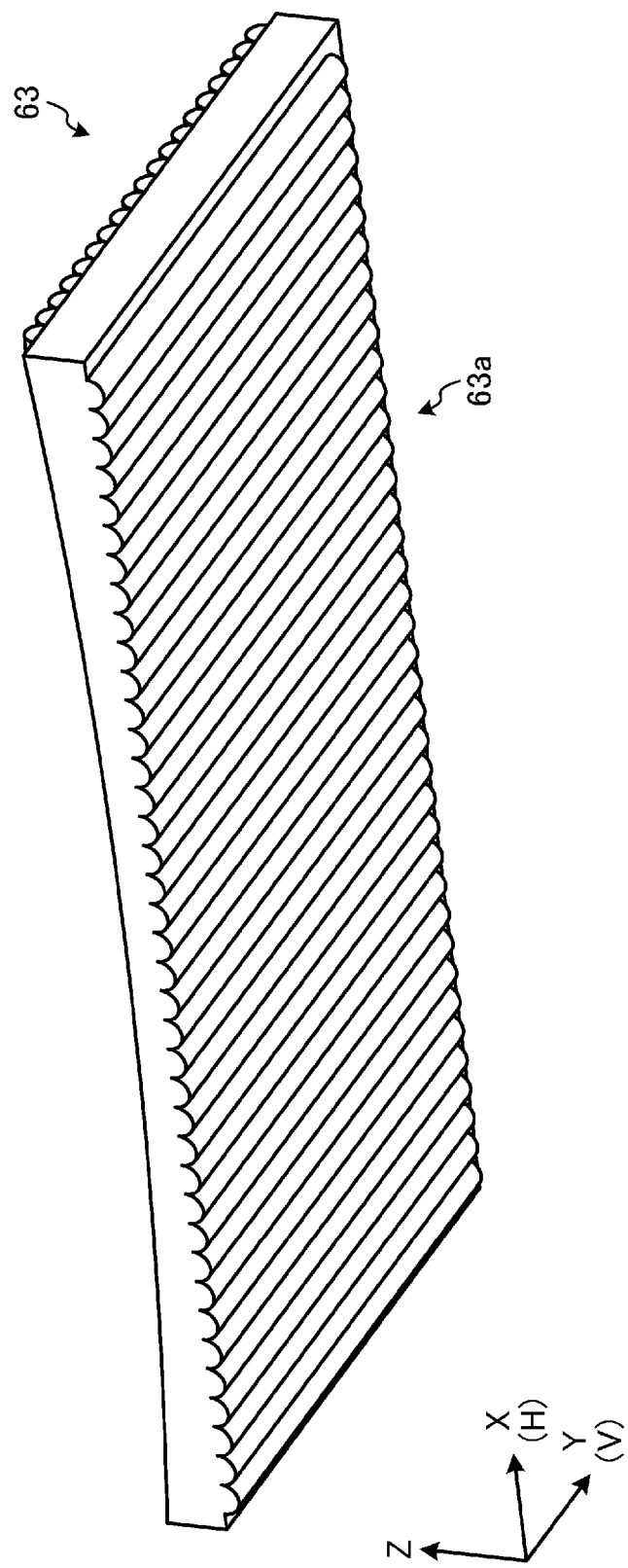
FIG. 20 is a diagram illustrating a structure at an incident side of a field lens.
Figure 21:
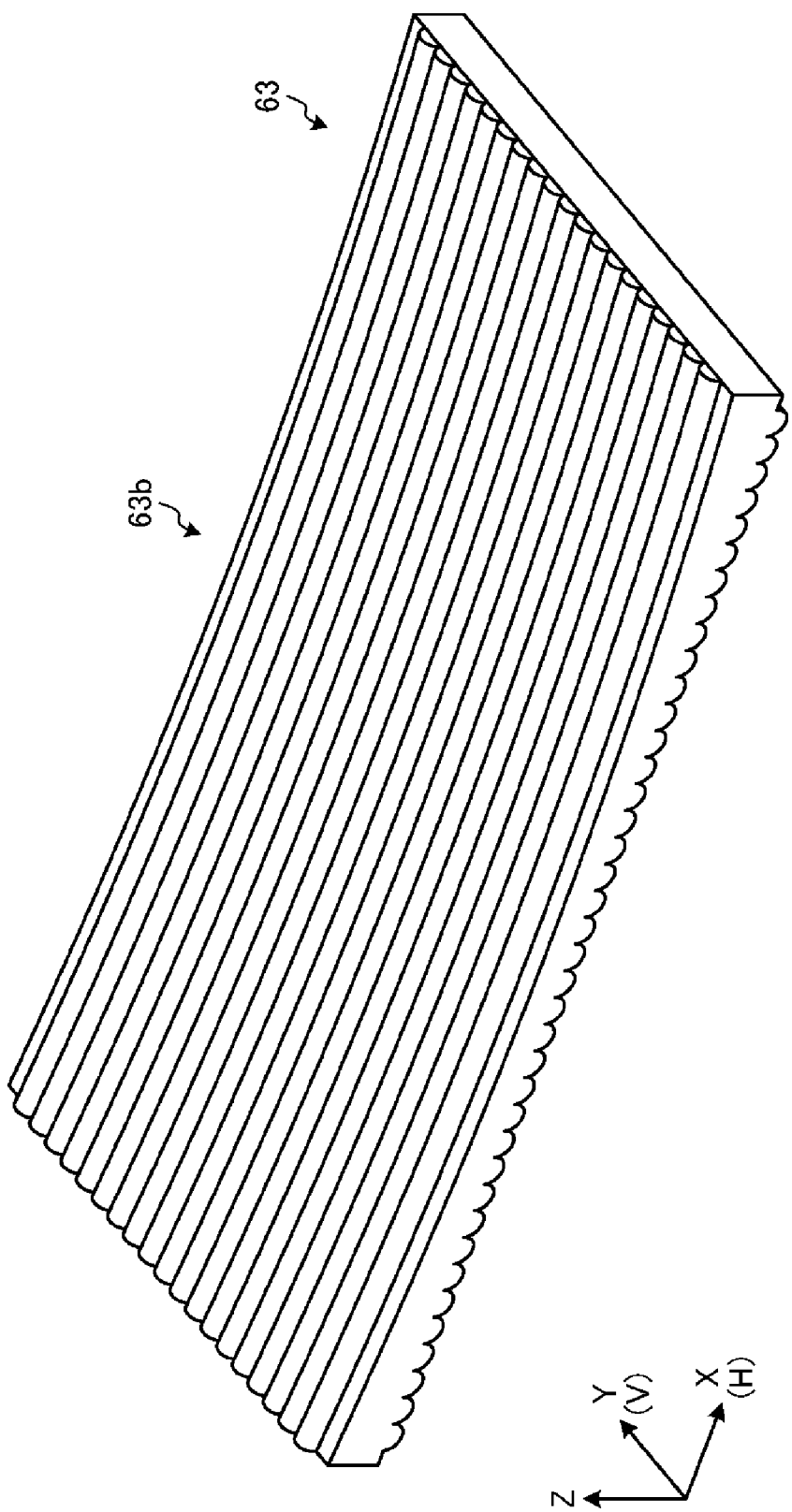
FIG. 21 is a diagram illustrating a structure at an emission side of the field lens.
Figure 22:
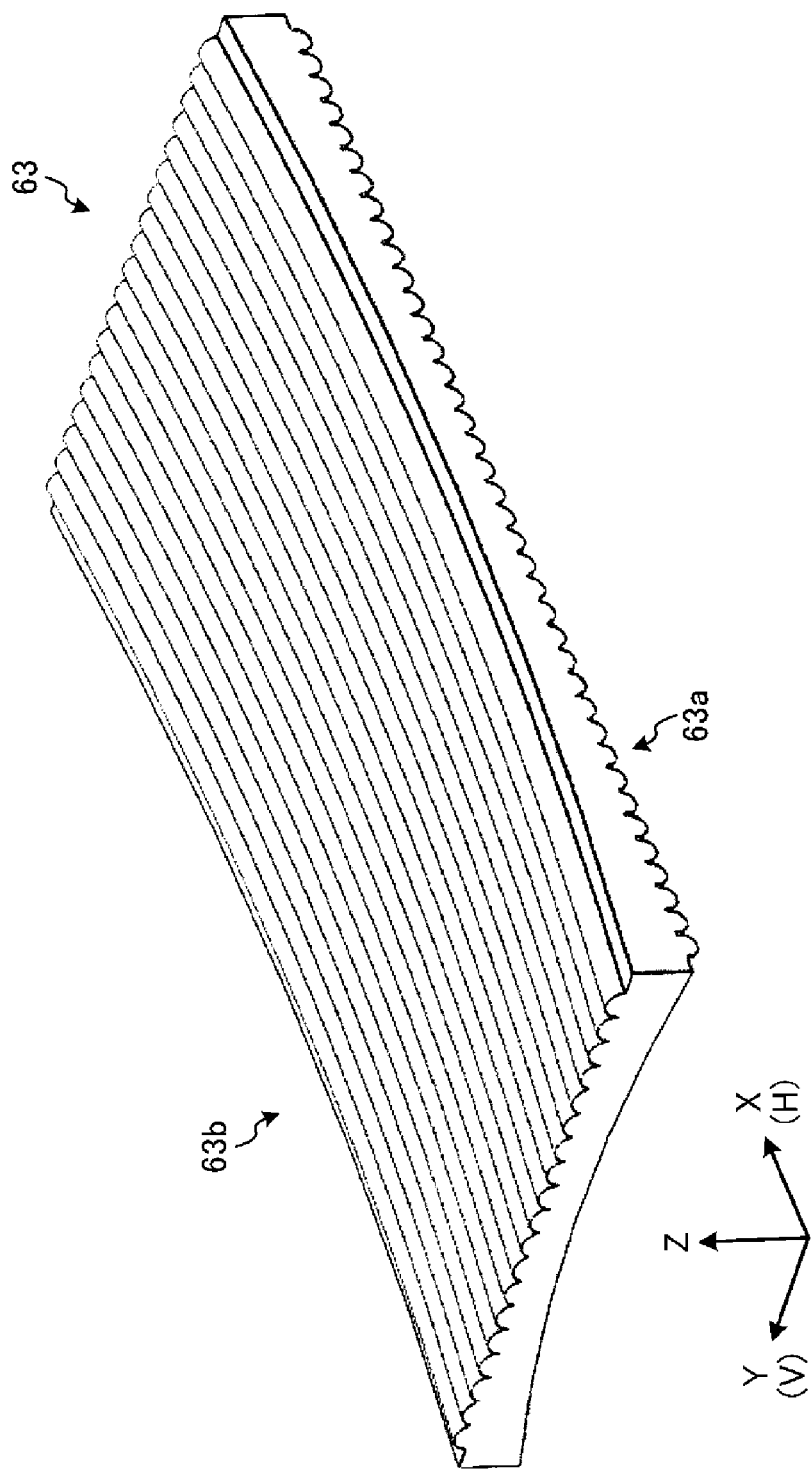
FIG. 22 is a diagram illustrating another example of the field lens.

FIG. 20 is a diagram illustrating the structure at the incident side of the field lens 63, and FIG. 21 is a diagram illustrating the structure at the emission side of the field lens 63. In FIGS. 20 and 21, a lenticular lens having a semicylindrical cross section is provided at a flat surface 63a at an incident side of the field lens 63 to extend in the V-axis direction. A surface 63b at the emission side of the field lens 63 is concave in the X-Z plane, and a lenticular lens having a semicylindrical cross section is provided at the surface 63b to extend in the X-axis direction. Although a case where the surface at the emission side of the field lens 63 is concave has been described, a surface at the incident side may be concave (surface at the emission side is flat). Furthermore, both surfaces at the incident side and the emission side of the field lens 63 may be concave. FIG. 22 is a diagram illustrating another example of the field lens 63, the surface 63a at the incident side is concave in the Y-Z plane, and the surface 63b at the emission side is concave in the X-Z plane.

Fourth Embodiment

In the fourth embodiment, a surface 5a at an incident side of a first condenser lens 5 condenses light into substantially parallel light in the horizontal direction, a surface 5b at an emission side condenses the light and tilts an optical axis in the perpendicular direction, a surface 6a at an incident side of a second field lens 6 diffuses the light in the horizontal direction, and a surface 6b at an emission side tilts the optical axis in the horizontal direction. In the head-up display system 100 of FIG. 1, the tilt of the optical axis in the horizontal direction is greater than the tilt in the perpendicular direction, but the optical axis can be tilted in two stages in the horizontal direction without difficulty and light having an appropriately controlled optical axis can be supplied to a concave mirror of a head-up display system using light of a planar illumination device. That is, it is structurally difficult to achieve condensing of light for each light source 3 such as an LED and a great tilt of the optical axis by a linear Fresnel lens formed on one surface, but it is easily implemented by condensing light into substantially parallel light once and then tilting the optical axis by a linear prism. Furthermore, light is diffused in the horizontal direction, but since a spread angle of light distribution required in the perpendicular direction is narrow and no diffusion is required in many cases, light is not diffused in the perpendicular direction.

Figure 23:
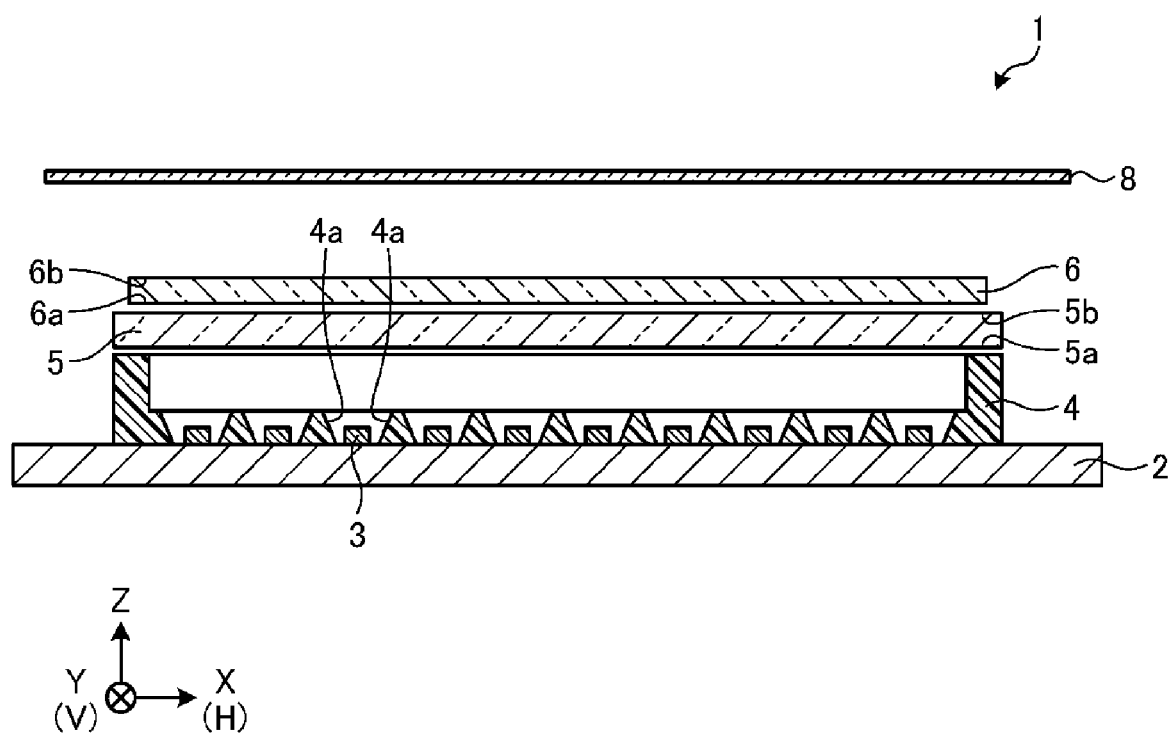
FIG. 23 is a cross-sectional view of the planar illumination device according to a fourth embodiment along an X-axis direction (horizontal direction).
Figure 24:
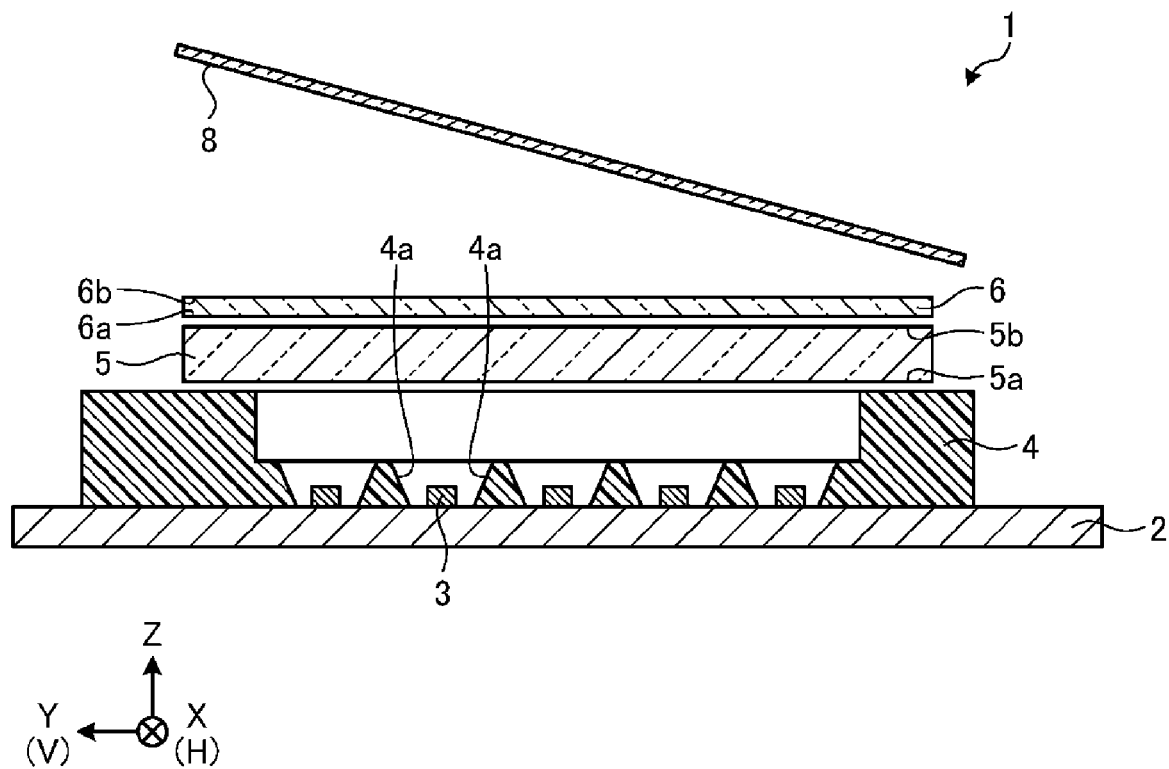
FIG. 24 is a cross-sectional view of the planar illumination device according to the fourth embodiment along a Y-axis direction (perpendicular direction).

FIG. 23 is a cross-sectional view of the planar illumination device 1 according to the fourth embodiment along the X-axis direction (horizontal direction). FIG. 24 is a cross-sectional view of the planar illumination device 1 according to the fourth embodiment along the Y-axis direction (perpendicular direction). In FIGS. 23 and 24, the substrate 2, the light source 3, the reflector 4, the condenser lens 5, and the field lens 6 are the same as in FIG. 3 (first embodiment). The present embodiment is different from FIG. 3 in that the entire width is illustrated, the frame 7 is not illustrated, and a diffusion sheet 8 disposed to be tilted with respect to the optical axis in the Y-Z plane is provided at the emission side of the field lens 6. The reason why the diffusion sheet 8 is disposed to be tilted with respect to the optical axis is for reducing the influence of external light (mainly sunlight).

In FIGS. 23 and 24, a first linear Fresnel lens for a horizontal direction provided at the surface 5a at the incident side of the condenser lens 5 is the same as in FIGS. 4 and 5. That is, a linear Fresnel lens is provided at the surface 5a at the incident side of the condenser lens 5 to condense light for each light source 3 such as an LED in the horizontal direction. The state of refraction of light rays in the horizontal direction by the condenser lens 5 is the same as in FIG. 8A.

Figure 25:
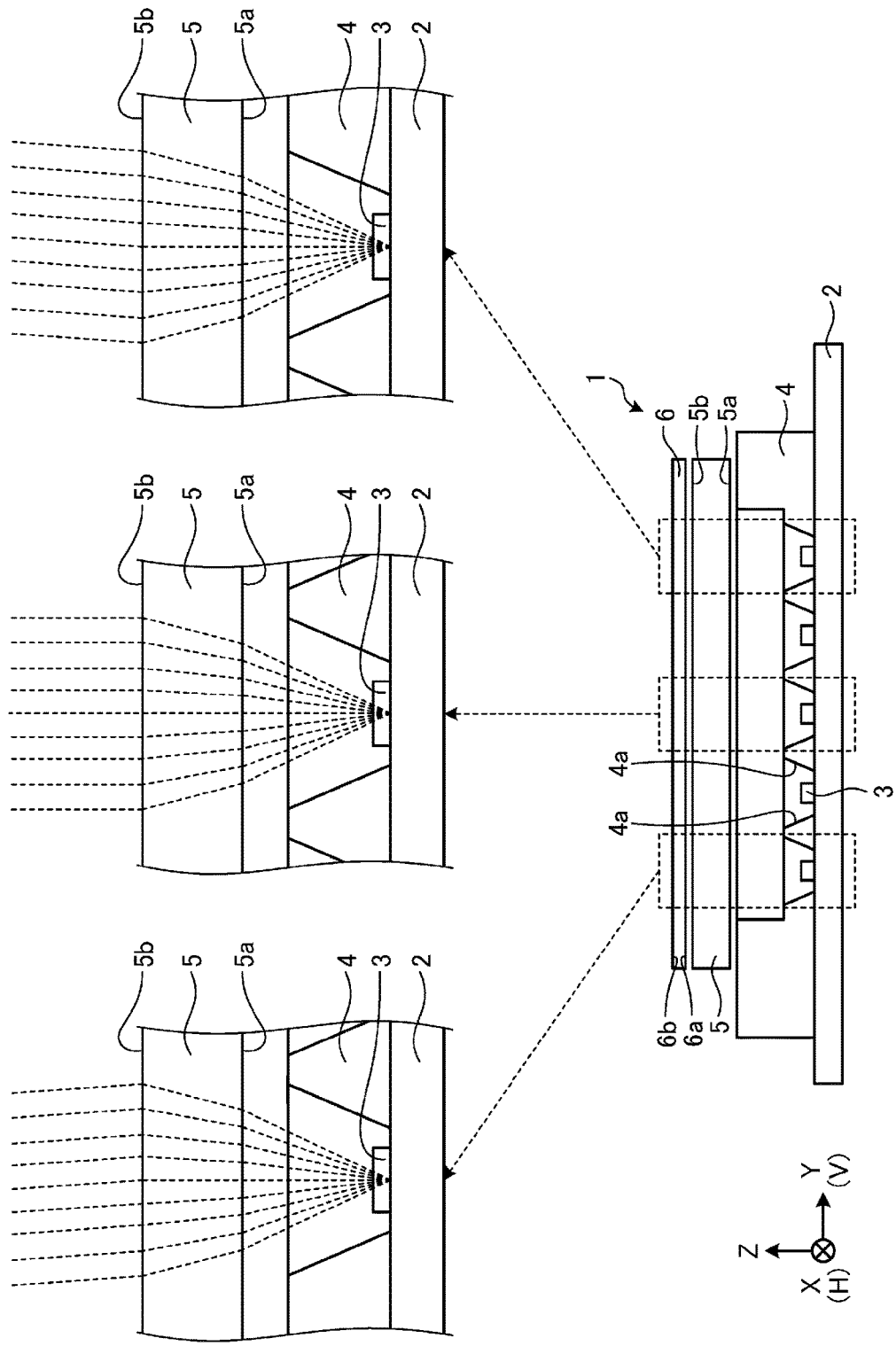
FIG. 25 is a diagram illustrating a state of refraction of light rays in the perpendicular direction by a surface at an emission side of the condenser lens.

In FIGS. 23 and 24, in a second linear Fresnel lens for a perpendicular direction provided at the surface 5b at the emission side of the condenser lens 5, the direction of a groove is the same as in FIGS. 4 and 5. However, the angle of the lens is adjusted to change the optical axis outward in the perpendicular direction during use according to a distance from the center in the perpendicular direction during use as well as condensing light into substantially parallel light for each light source 3 such as an LED. That is, the light remains substantially parallel light at the center of the emitting surface, and the optical axis is tilted outward from the center to the outside. Note that, as described above, regarding the tilting of the optical axis, the center may be tilted in a predetermined direction instead of being substantially parallel light, and the optical axis may be tilted outward with respect to the tilt of the center at both sides of the optical axis. FIG. 25 is a diagram illustrating a state of refraction of light rays in the perpendicular direction by the surface 5b at the emission side of the condenser lens 5. That is, FIG. 25 illustrates the behavior of light in a cross section along the perpendicular direction (Y, V) and the normal direction (Z) of the emitting surface during use. In FIG. 25, light is condensed into substantially parallel light at the center of the planar illumination device 1, and the optical axis is further tilted outward at both sides of the optical axis. Note that the field lens 6 is not illustrated.

In FIGS. 23 and 24, a lenticular lens for a horizontal direction formed with a groove extending in the Y-axis direction is provided at the surface 6a at the incident side of the field lens 6 to diffuse light in the horizontal direction. A linear prism for a horizontal direction formed with a groove extending in the Y-axis direction is provided at the surface 6b at the emission side of the field lens 6 to tilt the optical axis in the horizontal direction. FIG. 26 is a diagram illustrating a state of refraction of light rays in the horizontal direction by the field lens 6. That is, FIG. 26 illustrates the behavior of light in a cross section along the horizontal direction (X, H) and the normal direction (Z) of the emitting surface during use. In FIG. 26, the linear prism of the surface 6b at the emission side do not tilt the optical axis at the center, and increases the tilt of the optical axis toward the outside.

The lenticular lens of the surface 6a at the incident side is designed such that the spread angle of light at the outside is set to be greater than the spread angle of light due to diffusion at the center. This is for improving the luminance uniformity of a virtual image at an outer portion where the optical axis is tilted. That is, when light with strong directivity (light with a narrow spread angle) is emitted toward a user, the luminance changes abruptly when the user shakes his or her eyes to the left or right, resulting in a decrease in visibility. This is particularly noticeable at an end part where the optical axis is tilted. Therefore, the spread angle of light at the outside is set to be greater than the spread angle of light due to diffusion in the center. Thus, the luminance does not change abruptly when the user shakes his or her eyes to the left or right and the line of sight is attracted to an eye box displaying on a display screen, so that the visibility can be improved and the safety can be improved even when used while driving an automobile or the like.

Figure 27:
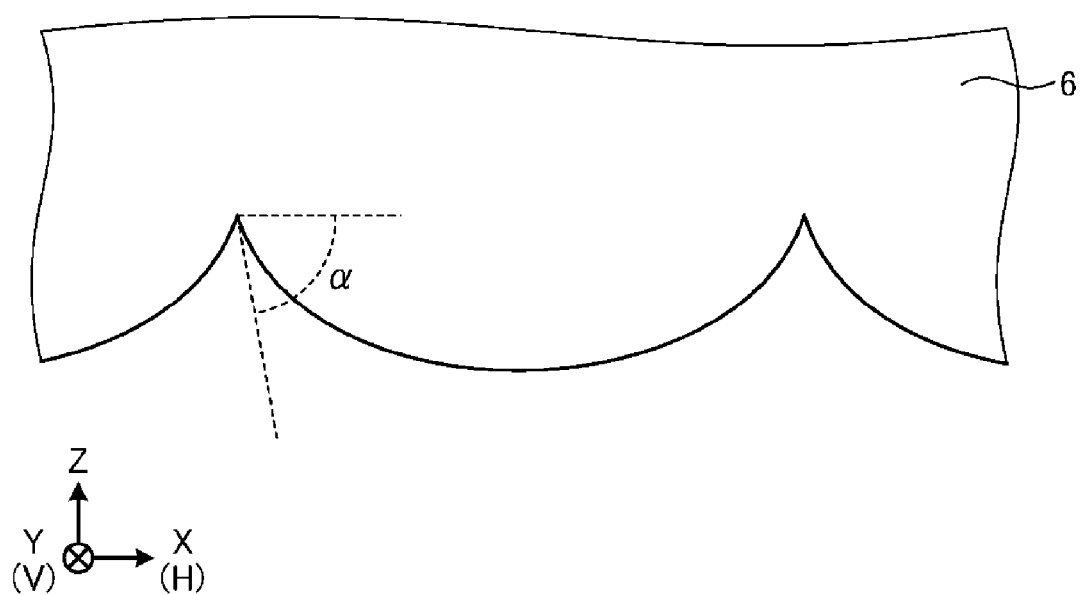
FIG. 27 is an enlarged cross-sectional view of a lenticular lens of a surface at an incident side of the field lens.

FIG. 27 is an enlarged cross-sectional view of the lenticular lens of the surface 6a at the incident side of the field lens 6, and when increasing a contact angle α of the lenticular lens (angle formed between a main surface of the field lens 6 and the tangent of an end part of an R shape), the spread angle of light can be increased. That is, the contact angle α at the center of the emitting surface is increased toward the outside.

The configuration and function at the incident side and the emission side of the above field lens 6 can also be changed, or the configuration and function at the incident side and the emission side of the condenser lens 5 can also be changed. That is, the surface 5a at the incident side of the first condenser lens 5 can condense light into substantially parallel light in the horizontal direction, the surface 5b at the emission side can condense the light and tilt an optical axis in the perpendicular direction, the surface 6a at the incident side of the second field lens 6 can tilt the optical axis in the horizontal direction, and the surface 6b at the emission side can diffuse the light in the horizontal direction. Alternatively, the surface 5a at the incident side of the first condenser lens 5 can condense the light and tilt the optical axis in the perpendicular direction, the surface 5b at the emission side can condense the light into substantially parallel light in the horizontal direction, the surface 6a at the incident side of the second field lens 6 can diffuse the light in the horizontal direction, and the surface 6b at the emission side can tilt the optical axis in the horizontal direction. Alternatively, the surface 5a at the incident side of the first condenser lens 5 can condense the light and tilt the optical axis in the perpendicular direction, the surface 5b at the emission side can condense the light into substantially parallel light in the horizontal direction, the surface 6a at the incident side of the second field lens 6 can tilt the optical axis in the horizontal direction, and the surface 6b at the emission side can diffuse the light in the horizontal direction.

Fifth Embodiment

In the fifth embodiment, the surface 5a at the incident side of the first condenser lens 5 condenses the light into substantially parallel light and tilts an optical axis in the horizontal direction, the surface 5b at the emission side condenses the light and tilts the optical axis in the perpendicular direction, the surface 6a at the incident side of the second field lens 6 diffuses the light in the horizontal direction, and the surface 6b at the emission side diffuses the light in the perpendicular direction. Thus, the tilting of the optical axis can be completed at the stage of the condenser lens 5 before entering the field lens 6, and the function of the field lens 6 can be limited only to diffusing light, thereby simplifying the configuration.

Figure 28:
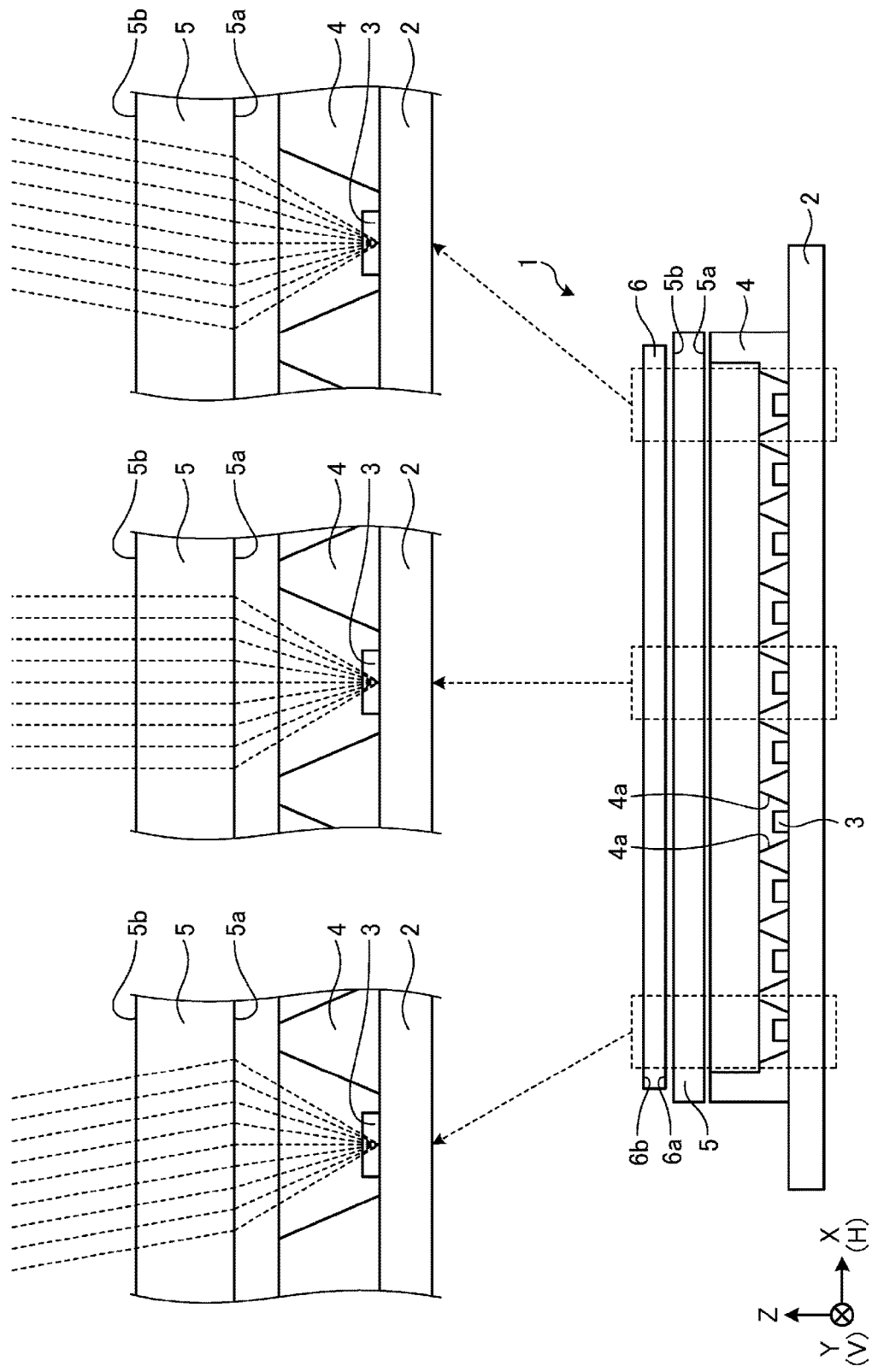
FIG. 28 is a diagram illustrating a state of refraction of light rays in the horizontal direction according to a fifth embodiment.

The outline of the overall configuration is the same as in FIGS. 23 and 24, but the configurations and the functions of the condenser lens 5 and the field lens 6 are slightly different. In the first linear Fresnel lens for a horizontal direction provided at the surface 5a at the incident side of the condenser lens 5, the angle of the lens is adjusted to change the optical axis outward in the horizontal direction during use according to a distance from the center in the horizontal direction during use as well as condensing light into substantially parallel light for each light source 3 such as an LED. That is, the light remains substantially parallel light at the center of the emitting surface, and the optical axis is tilted outward from the center to the outside. When the tilt of the optical axis in the horizontal direction is not so great, the first linear Fresnel lens alone can condense light and tilt the optical axis. FIG. 28 is a diagram illustrating a state of refraction of light rays in the horizontal direction according to the fifth embodiment. That is, FIG. 28 illustrates the behavior of light in a cross section along the horizontal direction (X, H) and the normal direction (Z) of the emitting surface during use. In FIG. 28, the field lens 6 is not illustrated. In FIG. 28, light is condensed into substantially parallel light at the center of the planar illumination device 1, and the optical axis is further tilted outward at both sides of the planar illumination device 1.

As in the fourth embodiment, in the second linear Fresnel lens for a perpendicular direction provided at the surface 5b at the emission side of the condenser lens 5, the angle of the lens is adjusted to change the optical axis outward in the perpendicular direction during use according to a distance from the center in the perpendicular direction during use as well as condensing light into substantially parallel light for each light source 3 such as an LED. The state of refraction of the light is the same as in FIG. 25. That is, the light remains substantially parallel light at the center of the emitting surface, and the optical axis is tilted outward from the center to the outside. Note that, as described above, regarding the tilting of the optical axis, the center may be tilted in a predetermined direction instead of being substantially parallel light, and the optical axis may be tilted outward with respect to the tilt of the center at both sides of the optical axis.

Similar to the fourth embodiment, a lenticular lens for a horizontal direction formed with a groove extending in the Y-axis direction is provided at the surface 6a at the incident side of the field lens 6 to diffuse light in the horizontal direction. A lenticular lens for a perpendicular direction formed with a groove extending in the X-axis direction is provided at the surface 6b at the emission side of the field lens 6 to diffuse light in the perpendicular direction.

The configuration and function at the incident side and the emission side of the above field lens 6 can also be changed, or the configuration and function at the incident side and the emission side of the condenser lens 5 can also be changed. That is, the surface 5a at the incident side of the first condenser lens 5 can condense light and tilt an optical axis in the horizontal direction, the surface 5b at the emission side can condense the light and tilt the optical axis in the perpendicular direction, the surface 6a at the incident side of the second field lens 6 can diffuse the light in the perpendicular direction, and the surface 6b at the emission side can diffuse the light in the horizontal direction. Alternatively, the Surface 5a at the incident side of the first condenser lens 5 can condense the light and tilt the optical axis in the perpendicular direction, the surface 5b at the emission side can condense the light and tilt the optical axis in the horizontal direction, the surface 6a at the incident side of the second field lens 6 can diffuse the light in the horizontal direction, and the surface 6b at the emission side can diffuse the light in the perpendicular direction. Alternatively, the surface 5a at the incident side of the first condenser lens 5 can condense the light and tilt the optical axis in the perpendicular direction, the surface 5b at the emission side can condense the light into substantially parallel light in the horizontal direction, the surface 6a at the incident side of the second field lens 6 can diffuse the light in the perpendicular direction, and the surface 6b at the emission side can diffuse the light, in the horizontal direction.

Sixth Embodiment

Figure 29:
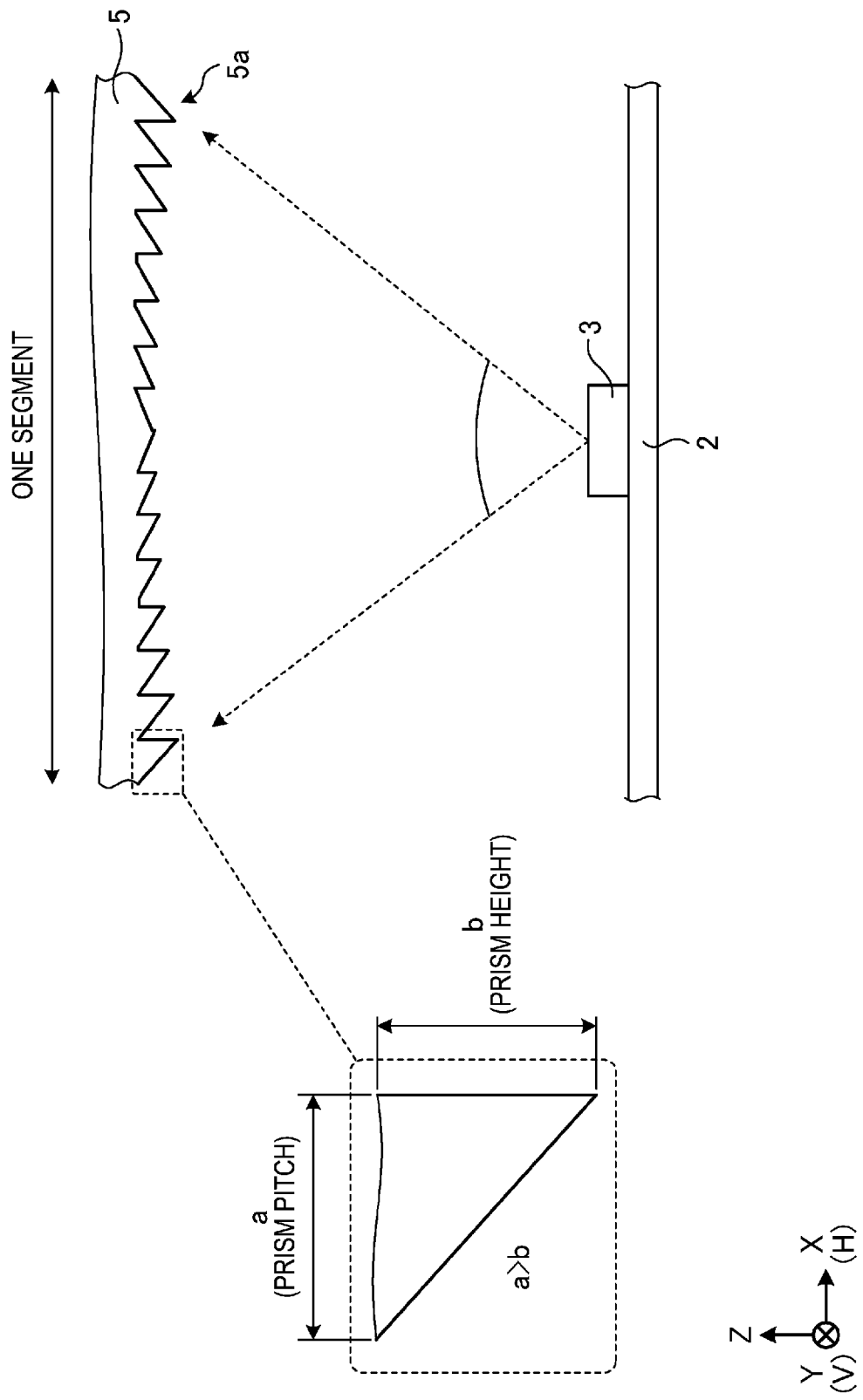
FIG. 29 is a diagram illustrating an example of the relationship between a spread angle of light emitted from a light source 3 and a prism pitch/a prism height.

Next, a description is given on how to devise a prism height relatively low with respect to the prism pitch of the linear Fresnel lens used in each of the above-described embodiments. FIG. 29 is a diagram illustrating an example of the relationship between a spread angle of light emitted from the light source 3 and a prism pitch/a prism height. FIG. 29 illustrates a state of light being emitted from one light source 3 disposed at the substrate 2 with a light distribution spread over a predetermined angle and is incident at a region corresponding to one segment of the linear Fresnel lens formed at the surface 5a of the condenser lens 5. Some prisms of the linear Fresnel lens are illustrated enlarged, and the prism pitch is indicated by a and the prism height is indicated by b.

In the linear Fresnel lens corresponding to a convex lens for performing light condensing (conversion to light parallel to the normal direction), the prism height b with respect to the prism pitch a is relatively less at the center of the segment, but the prism height b with respect to the prism pitch a is relatively great at an end part of the segment. When the spread angle of incident light from the light source 3 is increased while the pattern of the linear Fresnel lens is the same, since a portion farther from the center is used as one segment, the prism height b is further increased at the end part of the segment. The increase in the prism height b is not preferable because the thickness of the linear Fresnel lens is increased or an angle is increased, and at this angle, light needs to be refracted. This results in a decrease in light efficiency.

Therefore, the spread angle of light emitted from the light source 3 is set to, for example, approximately 90° or less (approximately −45° or less to approximately +45° or less with respect to the normal direction), and the prism height b with respect to the prism pitch a at the end part of the segment is set to be relatively less (a>b). That is, only a center portion satisfying a>b is used as one segment.

As described above, since the backlight for the head-up display is required to have a high luminance of about 100 times the backlight for the normal display, high luminance is required for the light source 3 such as an LED. In this respect, since a high-luminance LED and the like have a narrow angle of light distribution and have a spread angle of emitted light of 90° or less in many cases, it is convenient to narrow the spread angle of light emitted from the light source 3 in order to reduce the prism height b. Accordingly, the spread angle of light emitted from the light source 3 is set to be approximately 90° or less, and the prism pitch a and the prism height b are set to satisfy a>b, so that the linear Fresnel lens can be thinned, the light efficiency can be improved, and high luminance can be further achieved.

Although the linear Fresnel lens formed at the surface 5a (FIG. 3) of the condenser lens 5 has been described, the same can be applied to the linear Fresnel lens formed at the surface 5b (FIG. 3) of the condenser lens 5, the surface 51a of the condenser lens 51, or the surface 52b (FIGS. 6 and 7) of the condenser lens 52, or the linear Fresnel lens illustrated in the other embodiments.

Embodiments of the present invention have been described above, but the present invention is not limited to the embodiments described above, and various modifications are possible without departing from the spirit of the present invention.

As described above, the planar illumination device according to the embodiment includes a substrate including a plurality of light sources disposed two-dimensionally in a grid pattern, a first linear Fresnel lens disposed at an emission side of the plurality of light sources and formed with a groove constituting a concave-convex surface of the first linear Fresnel lens, the groove extending in one direction, and a second linear Fresnel lens disposed at an emission side of the first linear Fresnel lens and formed with a groove constituting a concave-convex surface of the second linear Fresnel lens, the groove extending in a direction orthogonal to the one direction. This makes it possible to simultaneously satisfy some of performances and functions such as high luminance, high contrast, high luminance uniformity, low power consumption, thinness, and support for local dimming.

That is, two orthogonal linear Fresnel lenses efficiently collimate substantially parallel light or light with an arbitrarily tilted optical axis, so that high luminance and high luminance uniformity can be achieved. Furthermore, local dimming can be handled by a plurality of light sources disposed two-dimensionally in a grid pattern, and high contrast can be achieved. Furthermore, high luminance can be achieved, so that low power consumption can be achieved for the same degree of luminance as in the conventional art. Furthermore, thickness reduction can be achieved using the linear Fresnel lens.

Furthermore, the first linear Fresnel lens is provided corresponding to one of rows or columns of the plurality of light sources disposed two dimensionally in the grid pattern, and the second linear Fresnel lens is provided corresponding to the other one of the rows or the columns. Thus, a linear Fresnel lens with a straight shape is formed in the unit of columns or rows in accordance with a plurality of linearly arranged light sources, so that the manufacturing can be facilitated and cost reduction can be achieved, compared to when an annular linear Fresnel lens is formed for each light source.

Furthermore, the planar illumination device includes a condenser lens provided with the first linear Fresnel lens at one surface of the condenser lens and provided with the second linear Fresnel lens at the other surface of the condenser lens. This enables the first linear Fresnel lens and the second linear Fresnel lens to be implemented by one condenser lens, and the structure can be simplified.

Furthermore, the planar illumination device includes a first condenser lens provided with the first linear Fresnel lens at one surface of the first condenser lens, and a second condenser lens provided with the second linear Fresnel lens at the other surface of the second condenser lens. Thus, the manufacturing becomes easier.

Furthermore, one of the first linear Fresnel lens or the second linear Fresnel lens condenses light into substantially parallel light in a cross section along a horizontal direction and a normal direction of an emitting surface during use, and the other one of the first linear Fresnel lens or the second linear Fresnel lens condenses light into substantially parallel light in a cross section along a perpendicular direction and the normal direction of the emitting surface during use. This makes it possible to efficiently condense light into parallel light.

Furthermore, the planar illumination device includes a field lens disposed at an emission side of the second linear Fresnel lens to change a light distribution. This makes it possible to implement appropriate light distribution.

Furthermore, one of the first linear Fresnel lens or the second linear Fresnel lens condenses the light into substantially parallel light in the cross section along the horizontal direction and the normal direction of the emitting surface during use, the other one of the first linear Fresnel lens or the second linear Fresnel lens tilts an optical axis outward in the perpendicular direction during use according to a distance from a center in the perpendicular direction during use, one of an incident side or an emission side of the field lens diffuses the light by a lenticular lens in the cross section along the horizontal direction and the normal direction of the emitting surface during use, and the other one of the incident side or the emission side of the field lens tilts the optical axis outward in the horizontal direction during use by a linear prism according to a distance from a center in the horizontal direction during use. This, when the tilt of the optical axis in the horizontal direction during use is great, the optical axis can be tilted in two stages without difficulty and light having an appropriately controlled optical axis can be supplied to a concave mirror of a head-up display system using light of the planar illumination device. Furthermore, only light in the horizontal direction during use can be diffused when the luminance uniformity of a virtual image is problematic with respect to the movement of the line of sight, and the luminance uniformity of the virtual image can be improved.

Furthermore, a contact angle at an R-shaped end part of the lenticular lens increases outward with respect to a center portion in the horizontal direction during use. This makes it possible to easily increase the spread of light outside the center portion with respect to light in the horizontal direction during use, and to improve the luminance uniformity of a virtual image with respect to the movement of the line of sight.

Furthermore, one of the first linear Fresnel lens or the second linear Fresnel lens tilts the optical axis outward in the horizontal direction during use according to the distance from the center in the horizontal direction during use, and the other one of the first linear Fresnel lens or the second linear Fresnel lens tilts the optical axis outward in the perpendicular direction during use according to the distance from the center in the perpendicular direction during use. Thus, the tilting of the optical axis can be completed before entering a field lens, and the function of the field lens can be simplified.

Furthermore, the planar illumination device includes a second field lens disposed at the emission side of the second linear Fresnel lens and provided with a first lenticular lens at one surface of the second field lens and a second lenticular lens at the other surface of the second field lens, the first lenticular lens being formed with a groove constituting a concave-convex surface of the second field lens and extending in one direction, the second lenticular lens being formed with a groove constituting a concave-convex surface of the second field lens and extending in a direction orthogonal to the one direction. Thus, the light distribution of emitted light in the horizontal direction and the perpendicular direction can be spread, and the uniformity of luminance can be improved.

Furthermore, the planar illumination device includes a third field lens disposed at the emission side of the second linear Fresnel lens and provided with a first lenticular lens at one surface of the third field lens and a second lenticular lens at the other surface of the third field lens, the first lenticular lens being formed with a groove constituting a concave-convex surface of the third field lens and extending in one direction, the second lenticular lens being formed with a groove constituting a concave-convex surface of the third field lens and extending in a direction orthogonal to the one direction, either or both surfaces of the third field lens being concave. This makes it possible to reduce the number of main components.

Furthermore, the field lens tilts an optical axis outward in the horizontal direction during use according to a distance in the horizontal direction during use from a center of the planar illumination device. This makes it possible to supply light having an appropriately controlled optical axis to a concave mirror of a head-up display system using light of the planar illumination device. Furthermore, even though a user shakes his or her eyes to the left or right, the luminance does not change abruptly and the visibility can be improved.

Furthermore, the planar illumination device includes a minute dot provided at an emission side of the field lens to diffuse emitted light. Thus, the uniformity of luminance can be improved.

Furthermore, the planar illumination device includes a reflector disposed between the substrate and the first linear Fresnel lens and including a reflecting surface surrounding each of the plurality of light sources. This makes it possible to reduce the loss of light from the light source, thereby achieving high luminance.

Furthermore, a spread angle of light emitted from the light source is set to approximately 90° or less, and a prism pitch a and a prism height h of the linear Fresnel lens are set to satisfy a>b. Thus, the linear Fresnel lens can be thinned, the light efficiency can be improved, and the high luminance can be further achieved.

Moreover, the present invention is not limited to the embodiment described above. A configuration obtained by appropriately combining the above-mentioned constituent elements is also included in the present invention. Further effects and modification examples can be easily derived by a person skilled in the art. Thus, a wide range of aspects of the present invention is not limited to the embodiment described above and may be modified variously.

REFERENCE SIGNS LIST

1 Planar illumination device, 2 Substrate, 3 Light source, 4 Reflector, 4a Reflecting surface, 5, 51, 52 Condenser lens, 6, 61, 62, 63 Field lens, 7 Frame

The invention claimed is:

1. A planar illumination device comprising:
a substrate including a plurality of light sources disposed two-dimensionally in a grid pattern;
a first linear Fresnel lens disposed at an emission side of the plurality of light sources and formed with a groove constituting a concave-convex surface of the first linear Fresnel lens, the groove extending in one direction; and
a second linear Fresnel lens disposed at an emission side of the first linear Fresnel lens and formed with a groove constituting a concave-convex surface of the second linear Fresnel lens, the groove extending in a direction orthogonal to the one direction, wherein
the first linear Fresnel lens is provided corresponding to one of rows or columns of the plurality of light sources disposed two-dimensionally in the grid pattern, and has a prism structure with a cylindrical convex lens as a Fresnel lens for each segment of a row or a column of a corresponding light source, and
the second linear Fresnel lens is provided corresponding to the other one of the rows or the columns, and has a prism structure with a cylindrical convex lens as a Fresnel lens for each segment of a row or a column of a corresponding light source.

2. The planar illumination device according to claim 1, further comprising a condenser lens provided with the first linear Fresnel lens at one surface of the condenser lens and provided with the second linear Fresnel lens at the other surface of the condenser lens.

3. The planar illumination device according to claim 1, further comprising:
a first condenser lens provided with the first linear Fresnel lens at one surface of the first condenser lens; and
a second condenser lens provided with the second linear Fresnel lens at any surface of the second condenser lens.

4. The planar illumination device according to claim 1, to wherein
one of the first linear Fresnel lens or the second linear Fresnel lens condenses light into substantially parallel light in a cross section along a horizontal direction and a normal direction of an emitting surface during use, and the other one of the first linear Fresnel lens or the second linear Fresnel lens condenses light into substantially parallel light in a cross section along a perpendicular direction and the normal direction of the emitting surface during use.

5. The planar illumination device according to claim 1, further comprising a field lens disposed at an emission side of the second linear Fresnel lens to change a light distribution.

6. The planar illumination device according to claim 5, wherein
one of the first linear Fresnel lens or the second linear Fresnel lens condenses the light into substantially parallel light in the cross section along the horizontal direction and the normal direction of the emitting surface during use,
the other one of the first linear Fresnel lens or the second linear Fresnel lens tilts an optical axis outward in the perpendicular direction during use according to a distance from a center in the perpendicular direction during use,
one of an incident side or an emission side of the field lens diffuses the light by a lenticular lens in the cross section along the horizontal direction and the normal direction of the emitting surface during use, and
the other one of the incident side or the emission side of the field lens tilts the optical axis outward in the horizontal direction during use by a linear prism according to a distance from a center in the horizontal direction during use.

7. The planar illumination device according to claim 6, wherein a contact angle at an R-shaped end part of the lenticular lens increases outward with respect to a center portion in the horizontal direction during use.

8. The planar illumination device according to claim 5, wherein the field lens tilts an optical axis outward in the horizontal direction during use according to a distance in the horizontal direction during use from a center of the planar illumination device.

9. The planar illumination device according to claim 5, further comprising a minute dot provided at an emission side of the field lens to diffuse emitted light.

10. The planar illumination device according to claim 1, wherein
one of the first linear Fresnel lens or the second linear Fresnel lens tilts the optical axis outward in the horizontal direction during use according to the distance from the center in the horizontal direction during use, and
the other one of the first linear Fresnel lens or the second linear Fresnel lens tilts the optical axis outward in the perpendicular direction during use according to the distance from the center in the perpendicular direction during use.

11. The planar illumination device according to claim 1, further comprising a second field lens disposed at the emission side of the second linear Fresnel lens and provided with a first lenticular lens at one surface of the second field lens and a second lenticular lens at the other surface of the second field lens, the first lenticular lens being formed with a groove constituting a concave-convex surface of the second field lens and extending in one direction, the second lenticular lens being formed with a groove constituting a concave-convex surface of the second field lens and extending in a direction orthogonal to the one direction.

12. The planar illumination device according to claim 1, further comprising a third field lens disposed at the emission side of the second linear Fresnel lens and provided with a first lenticular lens at one surface of the third field lens and a second lenticular lens at the other surface of the third field lens, the first lenticular lens being formed with a groove constituting a concave-convex surface of the third field lens and extending in one direction, the second lenticular lens being formed with a groove constituting a concave-convex surface of the third field lens and extending in a direction orthogonal to the one direction, either or both surfaces of the third field lens being concave.

13. The planar illumination device according to claim 1, further comprising a reflector disposed between the substrate and the first linear Fresnel lens and including a reflecting surface surrounding each of the plurality of light sources.

14. The planar illumination device according to claim 1, wherein a spread angle of light emitted from the light source is set to approximately 90° or less, and a prism pitch a and a prism height b of the first linear Fresnel lens and/or the second linear Fresnel lens are set to satisfy a>b.

* * * * *